United States Patent
Singer et al.

(10) Patent No.: US 9,496,783 B2
(45) Date of Patent: *Nov. 15, 2016

(54) PARTIAL ARBITRARY MATRIX TOPOLOGY (PMAT) AND GENERAL TRANSPOSED SERIAL-PARALLEL TOPOLOGY (GTSP) CAPACITIVE MATRIX CONVERTERS RELATED APPLICATIONS

(71) Applicants: Sigmond Singer, Tel Aviv (IL); Yuval Beck, Pardessia (IL)

(72) Inventors: Sigmond Singer, Tel Aviv (IL); Yuval Beck, Pardessia (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 221 days.

This patent is subject to a terminal disclaimer.

(21) Appl. No.: 13/907,926

(22) Filed: Jun. 2, 2013

(65) Prior Publication Data

US 2013/0335053 A1   Dec. 19, 2013

Related U.S. Application Data

(63) Continuation of application No. 12/835,757, filed on Jul. 14, 2010, now Pat. No. 8,456,874.

(60) Provisional application No. 61/225,568, filed on Jul. 15, 2009.

(51) Int. Cl.
  *H02M 3/18* (2006.01)
  *H02M 3/02* (2006.01)
  *H02M 3/07* (2006.01)

(52) U.S. Cl.
  CPC ................. *H02M 3/02* (2013.01); *H02M 3/07* (2013.01)

(58) Field of Classification Search
  CPC .. H02M 3/07; H02M 3/18; H02M 2003/072; H03K 3/356121
  USPC ................ 363/59, 60, 61, 62; 307/109, 110; 327/536, 537
  See application file for complete search history.

(56) References Cited

U.S. PATENT DOCUMENTS

| 4,451,743 | A |   | 5/1984 | Suzuki |
| 4,578,772 | A |   | 3/1986 | Fujii |
| 4,807,104 | A | * | 2/1989 | Floyd ..................... H02M 3/07 307/110 |

(Continued)

OTHER PUBLICATIONS

J. D. Cockroft and E. T. Walton, "Production of High Velocity Positive Ions," Proc. Roy. Soc., A, vol. 136, pp. 619-630, 1932.

(Continued)

*Primary Examiner* — Rajnikant Patel
(74) *Attorney, Agent, or Firm* — Reches Patents

(57) ABSTRACT

A direct current (DC) to DC converter, including: input ports for receiving an input DC voltage; output ports for outputting an output DC voltage; a first matrix of capacitors and switches; a second matrix of capacitors and switches; and a control circuit, coupled to the switches of the first and second matrices, configured to repetitively: (i) configure the first matrix to a charge configuration and couple the first matrix to the input ports while configuring the second matrix to a discharge configuration and coupling the second matrix to the output ports; (ii) maintain the charge and discharge configurations for a first period of time; (iii) configure the second matrix to the charge configuration and couple the second matrix to the input ports while configuring the first matrix to the discharge configuration and couple the first matrix to the output ports; and (iv) maintain the charge and discharge configurations for a second period of time.

14 Claims, 35 Drawing Sheets

(56) References Cited

U.S. PATENT DOCUMENTS

| | | | | |
|---|---|---|---|---|
| 5,532,916 | A * | 7/1996 | Tamagawa | H02M 3/07 307/110 |
| 6,198,645 | B1 * | 3/2001 | Kotowski | H02M 3/07 307/110 |
| 6,525,949 | B1 | 2/2003 | Johnson et al. | |
| 6,642,773 | B2 * | 11/2003 | Lin | H02M 3/073 327/536 |
| 6,720,822 | B2 | 4/2004 | Torrisi | |
| 7,602,232 | B2 * | 10/2009 | Georgescu | H02M 3/07 327/536 |
| 2003/0058665 | A1 | 3/2003 | Kobayashi et al. | |
| 2003/0058666 | A1 | 3/2003 | Myono | |
| 2003/0058669 | A1 | 3/2003 | Myono | |
| 2004/0080964 | A1 | 4/2004 | Buchmann | |
| 2007/0091655 | A1 | 4/2007 | Oyama | |
| 2007/0139982 | A1 | 6/2007 | Ueno | |
| 2007/0211502 | A1 | 9/2007 | Komiya | |
| 2007/0211503 | A1 | 9/2007 | Oyama | |

OTHER PUBLICATIONS

J. Dickson, "On-Chip High-Voltage Generation in NMOS Integrated Circuits Using an Improved Voltage Multiplier Technique,"IEEE J. Solid-State Circuits, vol. 11, No. 6, pp. 374-378, Jun. 1976.
D. Maximovic and S. Dhar, "Switched-Capacitor DC-DC Converters for Low-Power on-Chip Applications", IEEE 30th Annual Power Electronics Specialists Conference, 1999. PESC 99, Aug. 1999.
J. Han, A.V, Jouanne and G.C. Temes, "A New Approach to Reducing Output Ripple in Switched-Capacitor-Based Step-Down DC-DC Converters" IEEE Trans. on Power Elect., vol. 21, No. 6, Nov. 2006.
C. Chang, and M. Knights, "Interleaving Technique in Distributed Power-Conversion Systems", IEEE Trans. Circuits Syst. I, Fundam. Theory Appl., vol. 42, No. 5, pp. 245-251, May 1995.
S. Ozeri, D. Shmilovitz, S. Singer, and L. M. Salamero, "The Mathematical Foundation of Distributed Interleaved Systems," IEEE Trans. On Circuits and System-I, vol. 54, No. 2, Feb. 2007.
G. Zhu, A. Ioinovici, "Switched-Capacitor Power Supplies: DC Voltage Ratio, Efficiency, Ripple, Regulation", IEEE International Symposium on Circuits and Systems, ISCAS 96', Atlanta, May 1996.
B. Axelrod, Y. Berkovich, A. Ioinovici, "Switched-Capacitors/Switched-Inductor Structures for Getting Transformerless Hybrid DC-DC PWM Converters.", IEEE Trans. On Circuits and Systems-I, vol. 55, No. 2, Mar. 2008.
Y. K. Ramadass and A. P. Chandrakasan, "Voltage Scalable Switched Capacitor DC-DC Converter for Ultra-Low-Power On-Chip Applications", Power Electronics Specialists Conference, 2007, PESC 2007, Jun. 2007.
S.V. Cheong, H. Chung, A. Ioinovici, "Inductorless DC-to-DC Converter with High Power Density", IEEE Trans. On Industrial Elect., vol. 41, No. 2, Apr. 1994.
Jae-Yaul Lee, Sung-Eun Kim, Seong-kyung Kim, Jin-Kyung Kim, Sunyoung Lim, Hoi-Jun Yoo, "A Regulated Charge Pump With Small Ripple Voltage and Fast Start Up", IEEE J. of Solid-State Circuits, vol. 41, No. 2. pp. 425-432, Feb. 2009.
A. Cabrini, A. Fantini, G. Torelli, "High-Efficiency Regulator for On-Chip Charge Pump Voltage Elevarors", Electronics Letters, vol. 42, No. 17, pp. 972-973, Aug. 2006.
S. Singer, "Transformer Description of a Family of Switched Systems", IEE Proc. vol. 129, No. 5, Oct. 1982.
Y.Beck and S.Singer, "Capacitive Matrix Converters", 11th IEEE Workshop on Control and Modeling for Power Electronics, COMPEL 2008, Aug. 18-20, 2008.
Cormen, Leiserson, Rivest, and Stein "Introduction to Algorithms", Chapter 16 "Greedy Algorithms", 2001.
S. Singer, "Gyrators Application in Power Processing Circuits", IEEE Trans. on Industrial Electronics, vol. IE-34, No. 3, pp. 313-318, Aug. 1987.
M. Ehsani and M. O. Bilgic, "Power Converters as Natural Gyrators," IEEE Trans. On ircuits and Systems, vol. 40, No. 12, pp. 946-949 Dec. 1993.
R. Erickson, "Dc-Dc Power Converters," article in Wiley Encyclopedia of Electrical and lectronics Engineering, vol. 5, pp. 53-63, 1999.
A. Cid-Pastor, L.M. Salamero, C. Alonso, G.Schweitz and R.Leyva, "DC Power Gyrator versus DC Power Transformer for Impedance Matching of a PV Array", EPE-PEMC 2006. 12th International Power Electronics and Motion Control Conference, 2006.
H. L. Alder, "Partition Identities—From Euler to the Present", The American Mathematical Monthly, vol. 76, No. 7, pp. 733-746, Aug.-Sep. 1969.
S. Singer, "Loss Free Gyrator Realization.", IEEE Trans. Circuits Syst., vol. 35, No. 1, pp. 26-34, Jan. 1988.
M. D. Seeman and S. R. Sanders, "Analysis and Optimization of Switched-Capacitor DC-DC Converters", IEEE Trans. on Power Electronics. vol. 23, No. 2, pp. 841-851. Mar. 2008.
R.W. Erickson, "Fundamentals of Power Electronics", pp. 94-104, Chapman & Hall, 1997.

* cited by examiner

PARTIAL ARBITRARY MATRIX TOPOLOGY (PMAT) AND GENERAL TRANSPOSED SERIAL-PARALLEL TOPOLOGY (GTSP) CAPACITIVE MATRIX CONVERTERS RELATED APPLICATIONS

This application is a continuation application and claims the priority of U.S. patent application Ser. No. 12/835,757 filing date Jul. 14, 2010 which claims the benefit of U.S. provisional patent Ser. No. 61/255,568, filing date Jul. 15, 2009 which is incorporated herein by reference in its entirety.

BACKGROUND OF THE INVENTION

The following prior art references provide a brief review of the known art and are incorporated herein by reference:
[1] J. D. Cockroft and E. T. Walton, "Production of High Velocity Positive Ions," *Proc. Roy. Soc., A*, vol. 136, pp. 619-630, 1932
[2] J. Dickson, "On-Chip High-Voltage Generation in NMOS Integrated Circuits Using an Improved Voltage Multiplier Technique," *IEEE J. Solid-State Circuits*, vol. 11, no. 6, pp. 374-378, June 1976
[3] D. Maximovic and S. Dhar, "Switched-Capacitor DC-DC Converters for Low-Power on-Chip Applications", *IEEE 30th Annual Power Electronics Specialists Conference*, 1999. PESC 99, August 1999.
[4] J. Han, A. V, Jouanne and G. C. Temes, "A New Approach to Reducing Output Ripple in Switched-Capacitor-Based Step-Down DC-DC Converters" *IEEE Trans. on Power Elect.*, Vol. 21, No. 6, November 2006.
[5] C. Chang, and M. Knights, "Interleaving Technique in Distributed Power-Conversion Systems", *IEEE Trans. Circuits Syst. I, Fundam. Theory Appl.*, Vol. 42, no. 5, pp. 245-251, May 1995.
[6] S. Ozeri, D. Shmilovitz, S. Singer, and L. M. Salamero, "The Mathematical Foundation of Distributed Interleaved Systems," *IEEE Trans. On Circuits and System-I*, Vol. 54, No. 2, February 2007.
[7] G. Zhu, A. Ioinovici, "Switched-Capacitor Power Supplies: DC Voltage Ratio, Efficiency, Ripple, Regulation", *IEEE International Symposium on Circuits and Systems, ISCAS 96*, Atlanta, May 1996.
[8] B. Axelrod, Y. Berkovich, A. Ioinovici, "Switched-Capacitors/Switched-Inductor Structures for Getting Transformerless Hybrid DC-DC PWM Converters.", *IEEE Trans. On Circuits and Systems-I*, Vol. 55, No. 2, March 2008.
[9] Y. K. Ramadass and A. P. Chandrakasan, "Voltage Scalable Switched Capacitor DC-DC Converter for Ultra-Low-Power On-Chip Applications", *Power Electronics Specialists Conference*, 2007, PESC 2007, June 2007.
[10] S. V. Cheong, H. Chung, A. Ioinovici, "Inductorless DC-to-DC Converter with High Power Density", *IEEE Trans. On Industrial Elect.*, Vol. 41, No. 2, April 1994.
[11] Jae-Yaul Lee, Sung-Eun Kim, Seong-kyung Kim, Jin-Kyung Kim, Sunyoung Lim, Hoi-Jun Yoo, "A Regulated Charge Pump With Small Ripple Voltage and Fast Start Up", *IEEE J. of Solid-State Circuits*, Vol. 41, No. 2. pp. 425-432, February 2009.
[12] A. Cabrini, A. Fantini, G. Torelli, "High-Efficiency Regulator for On-Chip Charge Pump Voltage Elevarors", *Electronics Letters*, Vol. 42, No. 17, pp. 972-973, August 2006.
[13] S. Singer, "Transformer Description of a Family of Switched Systems", *IEE Proc.* Vol. 129, No. 5, October 1982.
[14] Y. Beck and S. Singer, "Capacitive Matrix Converters", $11^{th}$ IEEE Workshop on Control and Modeling for Power Electronics, COMPEL 2008, 18-20, Aug. 2008.
[15] Cormen, Leiserson, Rivest, and Stein "Introduction to Algorithms", Chapter 16 "Greedy Algorithms", 2001.
[16] S. Singer, "Gyrators Application in Power Processing Circuits", *IEEE Trans. on Industrial Electronics*, Vol. IE-34, No. 3, pp. 313-318, August 1987.
[17] M. Ehsani and M. O. Bilgic, "Power Converters as Natural Gyrators," *IEEE Trans. On Circuits and Systems*, Vol. 40, No. 12, pp. 946-949 December 1993.
[18] R. Erickson, "Dc-Dc Power Converters," article in *Wiley Encyclopedia of Electrical and Electronics Engineering*, vol. 5, pp. 53-63, 1999.
[19] A. Cid-Pastor, L. M. Salamero, C. Alonso, G. Schweitz and R. Leyva, "DC Power Gyrator versus DC Power Transformer for Impedance Matching of a PV Array", *EPE-PEMC 2006. 12th International Power Electronics and Motion Control Conference*, 2006.
[20] H. L. Alder, "Partition Identities—From Euler to the Present", *The American Mathematical Monthly*, Vol. 76, No. 7, pp. 733-746, August-September 1969.
[21] S. Singer, "Loss Free Gyrator Realization.", *IEEE Trans. Circuits Syst.*, Vol. 35, no. 1, pp. 26-34, January 1988.
[22] M. D. Seeman and S. R. Sanders, "Analysis and Optimization of Switched-Capacitor DC-DC Converters", *IEEE Trans. on Power Electronics*. Vol. 23, No. 2, pp. 841-851. March, 2008.
[23] R. W. Erickson, "Fundamentals of Power Electronics", pp. 94-104, Chapman & Hall, 1997.

Processes of development and manufacturing of integrated circuits based on semiconductors gained much progress during the last decade, both concerning the density of transistors for a unit area, increased manufacturing yield, reducing power consumption, etc. Large Scale Distribution of the power into cellular units which processes a couple of dozen of miliwatts (mW), enable the use of a cellular unit, which is implemented by simple techniques such as the Charge Pump (see: references [1] and [2]). This topology uses only switching elements such as transistors, diodes and capacitors as reactive components.

This topology is adequate for very low power conversion. It has an inherent disadvantage of generating EMC pollution since the current shape is very narrow. That is due to the fact that no inductance participates in the processing to limit the transition time of the current slope.

The building block components of the Charge Pump converter can be used through conventional semiconductor integrated technology. Large Scale Distribution to thousands of cellular converters leads to cellular processing power unit of miliwatts, which leads to small switching elements and small capacitors in the order of 50-100 Pf. Such small capacitors can be easily implemented as part of the silicon itself (see: reference [3]).

The disadvantage of the current shapes at the source and at the load are treated with an interleaving method for the reduction of the output ripple by means of distributing the converter to interleaved micro-converters (see: references [4]-[6]). Other work deals with the performance parameters of switched capacitor converters, such as DC input to output voltage ratio (see: references [7] and [8]).

SUMMARY OF THE INVENTION

A direct current (DC) to DC converter is provided. According to an embodiment of the invention the DC to DC converter includes: input ports for receiving an input DC voltage; output ports for outputting an output DC voltage; a first matrix of capacitors and switches; and a control circuit, coupled to the switches of the first matrix, configure d to repetitively: (i) configure the first matrix to a charge configuration and couple the first matrix to the input ports; maintain the charge configuration for a first period of time; (ii) configure the first matrix to the discharge configuration and couple the first matrix to the output ports; and (iii) maintain the discharge configurations for a second period of time. Wherein the charge configuration and the discharge configurations of the first matrix differ from each other by a replacement of serial connections of capacitors of the matrix to parallel connections of capacitors of the matrix. Wherein the charge configuration and a discharge configuration the first matrix are responsive to required conversion ratio between the input DC voltage and the output DC voltage; and wherein the first matrix comprises at least four capacitors.

The DC to DC converter may include a second matrix of capacitors and switches; wherein the control circuit, is coupled to the switches of the first and second matrices, and configure d to repetitively: configure the first matrix to the charge configuration and couple the first matrix to the input ports while configuring the second matrix to the discharge configuration and coupling the second matrix to the output ports; maintain the charge and discharge configurations for the first period of time; configure the second matrix to the charge configuration and couple the second matrix to the input ports while configuring the first matrix to the discharge configuration and couple the first matrix to the output ports; and maintain the charge and discharge configurations for the second period of time; wherein the charge configuration and the discharge configurations of the second matrix differ from each other by a replacement of serial connections of capacitors of the matrix to parallel connections of capacitors of the matrix; wherein the charge configuration and the discharge configuration of the second matrix are responsive to required conversion ratio between the input DC voltage and the output DC voltage; and wherein the second matrix comprises at least four capacitors.

The first and second matrices may be identical to each other.

All the capacitors of the first and second matrices may have a same capacitance.

Each of the first and second matrices may form a non-rectangular matrix of capacitors.

Each of the first and second matrices may form an arbitrary shaped matrix of capacitors.

The charging configuration may include multiple branches that are connected in parallel to each other. The discharging configuration may include serially connected elements. Each branch may include at least one serially connected capacitor. Each element may include at least one parallel connected capacitor. A number of branches may equal a number of elements. Each branch may have an associated element that includes a same number of capacitors.

At least two branches may differ by a number of capacitors of the branches.

At least one branch may include a single capacitor and at least one other branch may include multiple capacitors.

The first matrix and the second matrix may include at least three, at least four, at least five or even more switches per capacitor.

The first matrix and the second matrix may include multiple modular cells. Each modular cell may include a capacitor, five switches and six ports.

The modular cell may include: a first switch, connected between a first port and a sixth port; a second switch, connected between the sixth port and a second port; a capacitor, connected between the second port and a third switch; said third switch is connected between the capacitor and a fifth port; a fourth switch connected between the capacitor and a third port; and a fifth switch connected between the third port and a fourth port.

The control unit may be configure d to repetitively configure the first matrix, maintain, configure the second matrix and maintain at a rate that exceeds 1 megahertz.

The control unit may be arranged to determine the charge configuration and the discharge configuration of each of the first and second matrices based on the required conversion ratio between the input DC voltage and the output DC voltage.

A method for direct current (DC) to DC conversion is provided. The method may include repeating the stages of: (i) configuring a first matrix of switches and capacitors to a charge configuration; (ii) coupling the first matrix to input ports of a DC to DC converter for receiving an input DC voltage; (iii) configuring a second matrix of switches and capacitors to a discharge configuration; (iv) coupling the second matrix to output ports of the DC to DC converter for outputting an output DC voltage; (v) charging the first matrix and discharging the second matrix during a first period of time; (vi) configuring the second matrix to the charge configuration; (vii) coupling the second matrix to the input ports of the DC to DC converter for receiving the input DC voltage; (viii) configuring the first matrix to the discharge configuration; (ix) coupling the second matrix to the output ports of the DC to DC converter; and (x) charging the second matrix and discharging the first matrix during a second period of time. The charge configuration and the discharge configurations of each matrix out of the first and second matrices differ from each other by a replacement of serial connections of capacitors of the matrix to parallel connections of capacitors of the matrix. The charge configuration and a discharge configuration of each of the first and second matrices are responsive to required conversion ratio between the input DC voltage and the output DC voltage.

BRIEF DESCRIPTION OF THE PRESENT INVENTION

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE DRAWINGS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Multiple topologies of switched-capacitor converters and provided, taking into account integration considerations and multiple DC voltage ratios: (i) an ideal continuous capacitor, (ii) a matrix of capacitors, and (iii) a General Transposed Series-Parallel configuration (GTSP).

The GTSP configuration is based on parallel brunches of series capacitors in the charging state and series elements of parallel capacitors in the discharging state. This topology is suitable for fine tuning in the DC voltage ratios. The GTPS configuration can achieve required conversion ratios with fewer components than rectangular arrays.

The Ideal Continuous Capacitor

First, a theoretical capacitor is considered. This capacitor is defined as one that can change its capacitance continuously to any desired capacitance. This capacitance change does not require any additional energy and theoretically the capacitance change is done instantaneously with $\Delta t \to 0$. Next, the capacitor is connected in the circuit described in FIG. 1a illustrates continuous changed capacitance in an ideal transformer.

Figure 1A:
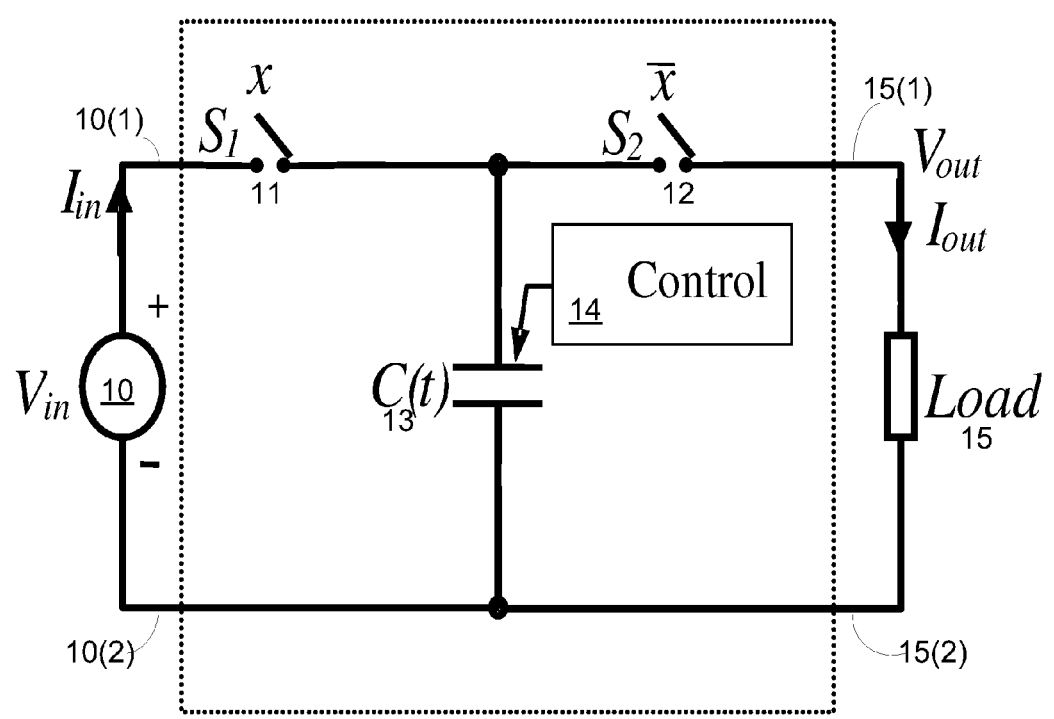
FIGS. 1A, 1B, 2A, 2B, 3 illustrate various circuits, charging and discharging configurations.

The following table illustrates the connectivity between the elements of circuit 8 of FIG. 1a:

| | First end | Second end | Control signal |
|---|---|---|---|
| Voltage supply 10 | (First input port 10(1)). First end of S1 | (Second input port 10(2)) Second end of C(t) and load | |
| S1 11 | Voltage supply | First end of S2 and C(t) | X |
| S2 12 | Second end of S1 and first end of C(t) | First end of load | x̄ |
| C(t) 13 | Second end of S1 and first end of S2 | Second end of voltage supply and load | |
| Load 15 | (First output port 15(1)). S2 | (Second out port 15(2)). Second end of C(t) and voltage supply | |

In order to realize a two port element characterized by a transformer, the circuit 8 described in FIG. 1a is presented. The state of the switches s1 11 and s2 12 is denoted by the Boolean variables x and x̄. Therefore, the circuit consists of two states.

The first is the charging state in which x=1, namely, $S_1$ 11 is closed and $S_2$ 12 is open. In this state the capacitor C(t) 13 has a capacitance of $C_1$ and is charged to the source voltage of $V_{in}$ 10.

The second state is the discharging state in which x=0, namely, $S_1$ 11 opens and $S_2$ 12 closes. In this state the control 14 changes the capacitance of the capacitor 13 to any value $C_2$ (the control is ideal with no energy consumption and the transition is immediate (with t→*0 sec). Moreover, the switching frequency is high enough; therefore the output voltage over Load 15 ripple can be neglected.

The above-mentioned yields power conservation from input to output, therefore:

$$Q_{in} = Q_{out} \quad (1)$$
$$\Downarrow$$
$$V_{in}^2 \cdot C_1 = V_{out}^2 \cdot C_2$$

Consequently the transmission from input to output is:

$$\frac{V_{out}}{V_{in}} = \sqrt{\frac{C_1}{C_2}} = n \quad (2)$$

The same can be formulated for the input and output current. The ideal $$\begin{bmatrix} V_{out} \\ I_{out} \end{bmatrix} = \begin{bmatrix} n & 0 \\ 0 & \frac{1}{n} \end{bmatrix} \begin{bmatrix} V_{in} \\ I_{in} \end{bmatrix}$$

transformer equation can be written as:

$$n = \sqrt{\frac{C_1}{C_2}} \quad (3)$$

Theoretically, in this "ideal" Direct-Coupled Transformer-DCT (see: reference [9]), any output voltage or current can be achieved, for a given input voltage or current respectively, by controlling the capacitance of each of the states (charging and discharging states).

Dual Capacitor Configuration

The ideal continuous capacitor in the configuration of FIG. 1a is connected to the input at the charging state and to the output at the discharging state. Thus, there is discontinuity in the input and output voltages and currents. To avoid this discontinuity, capacitors should be connected at the input and output terminals of the circuit. When integration is considered, such capacitors will have to be connected externally. To eliminate this external capacitor the following dual capacitor configuration is suggested.

Figure 1B:
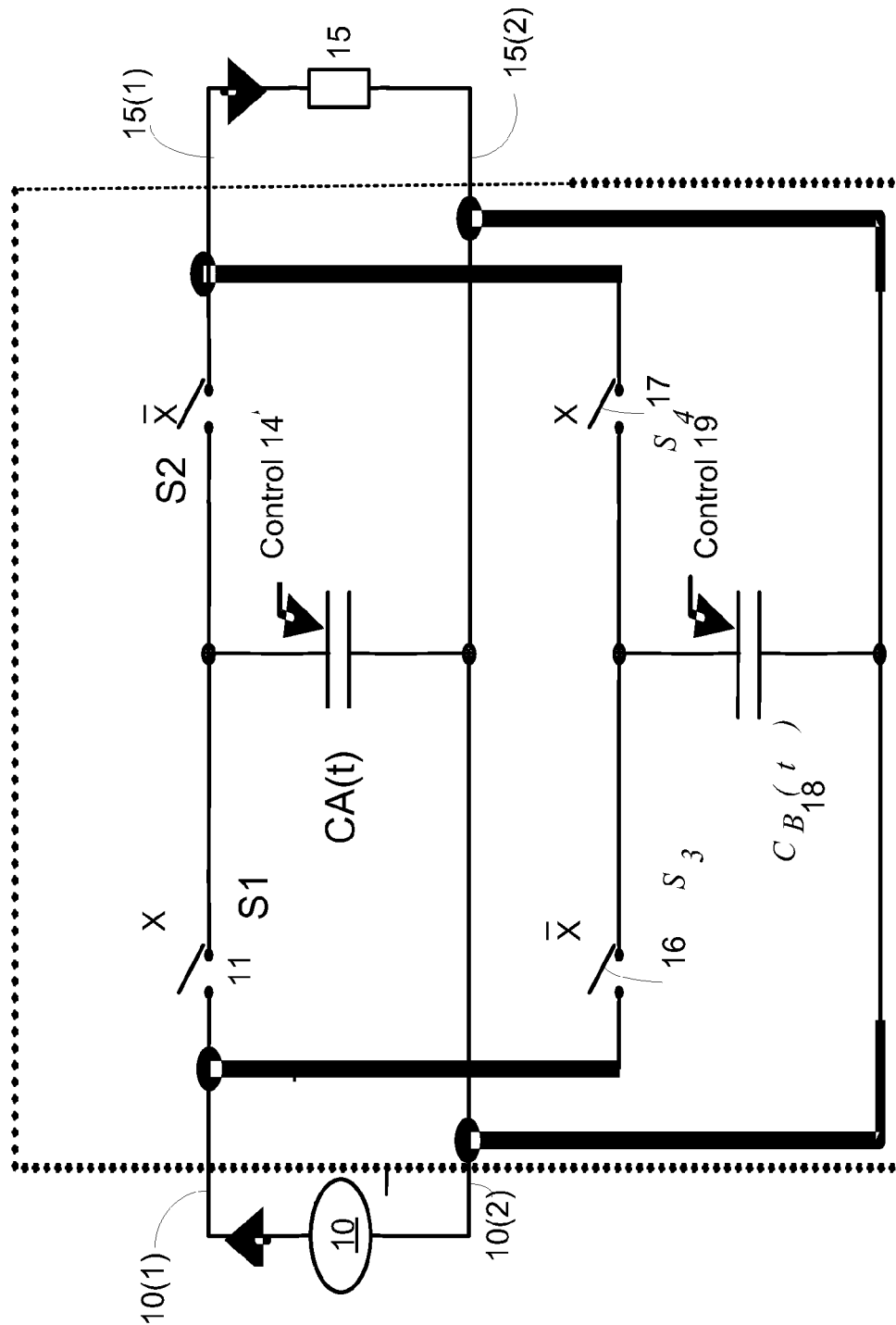

The following table illustrates the connectivity between the elements of circuit 9 of FIG. 1b:

| | First end | Second end | Control signal |
|---|---|---|---|
| Voltage supply 10 | First end of S1 and S3 | Second end of CA(t), CB(t) and load | |
| S1 11 | First end of voltage supply and S3 | First end of S2 and CA(t) | X |
| S2 12 | Second end of S1 and first end of CA(t) | First end of load and second end of S4 | x̄ |
| CA(t) 13 | First end of S2 and second end of S1 | Second end of voltage supply, CB(t) and load | |
| Load 15 | Second end of S2 and S4 | Second end of CA(t), CB(t) and voltage supply | |

-continued

| | First end | Second end | Control signal |
|---|---|---|---|
| S3 15 | First end of voltage supply and S1 | First end of S4 and CB(t) | $\bar{x}$ |
| S4 17 | Second end of S3 and first end of CB(t) | First end of load and second end of S2 | X |
| CB(t) 13 | Second end of S3 and first end of S4 | Second end of voltage supply, CB(t) and load | |

This configuration includes of two ideal continuous capacitors $C_A(t)$ 14 and $C_B(t)$ 18. These capacitors are complementary. Namely, when $C_A(t)$ 14 has a value of $C_1$, then $C_B(t)$ 18 has the value of $C_2$ and when $C_A(t)$ has a value of $C_2$, then $C_B(t)$ has the value of $C_1$. The circuit 9 has two operating states. In the first state x=1 and $S_1$ 11 and $S_4$ 17 are closed. In this state, $C_A(t)$ 14 has a capacitance of $C_1$ and is connected to the source 10. Therefore it is charged to the voltage of the source, $V_{in}$. $C_B(t)$ 18 has a capacitance of $C_2$ and is connected to the load 15 and is charged to the voltage of $V_{out}$. The second state occurs when x=0. In this state $S_1$ 11 and $S_4$ 17 are opened and $S_2$ 12 and $S_3$ 15 are closed. Thus, the same capacitances and voltages are connected to the source and the load, except for the fact that the two capacitors switch their position. Namely, $C_A(t)$ 14 is now connected to the output while $C_B(t)$ 18 is connected to the input. In the steady state (when frequency is high enough) the transmission between the input and the output follows equations (1) to (3).

In general the dual capacitor configuration of continuous capacitors, as presented here, can be a basic cell for applicable configurations based on discrete capacitors, with a fixed capacitance of C. This idea is presented in the following sections.

From Basic Series-Parallel to Matrix of Capacitors

In typical power electronics DC/DC applications the input and output voltages are known, or at least require a discrete number of conversions. A simple way to achieve this is by using the known series-parallel topology. This topology implements a step-up or a step-down converter by, in the charging state, connecting all capacitors in parallel to the input source. This topology implements a step-up or a step-down converter by connecting all capacitors in the charging state in parallel to the input source. In the discharging phase, the capacitors are connected in series with each other to the output. This simple operation and efficient utilization of capacitors makes it favorable for low-voltage designs. The number of identical capacitors will be determined by the input to output voltage ratio and the resolution of the required output voltage.

Figure 2A:
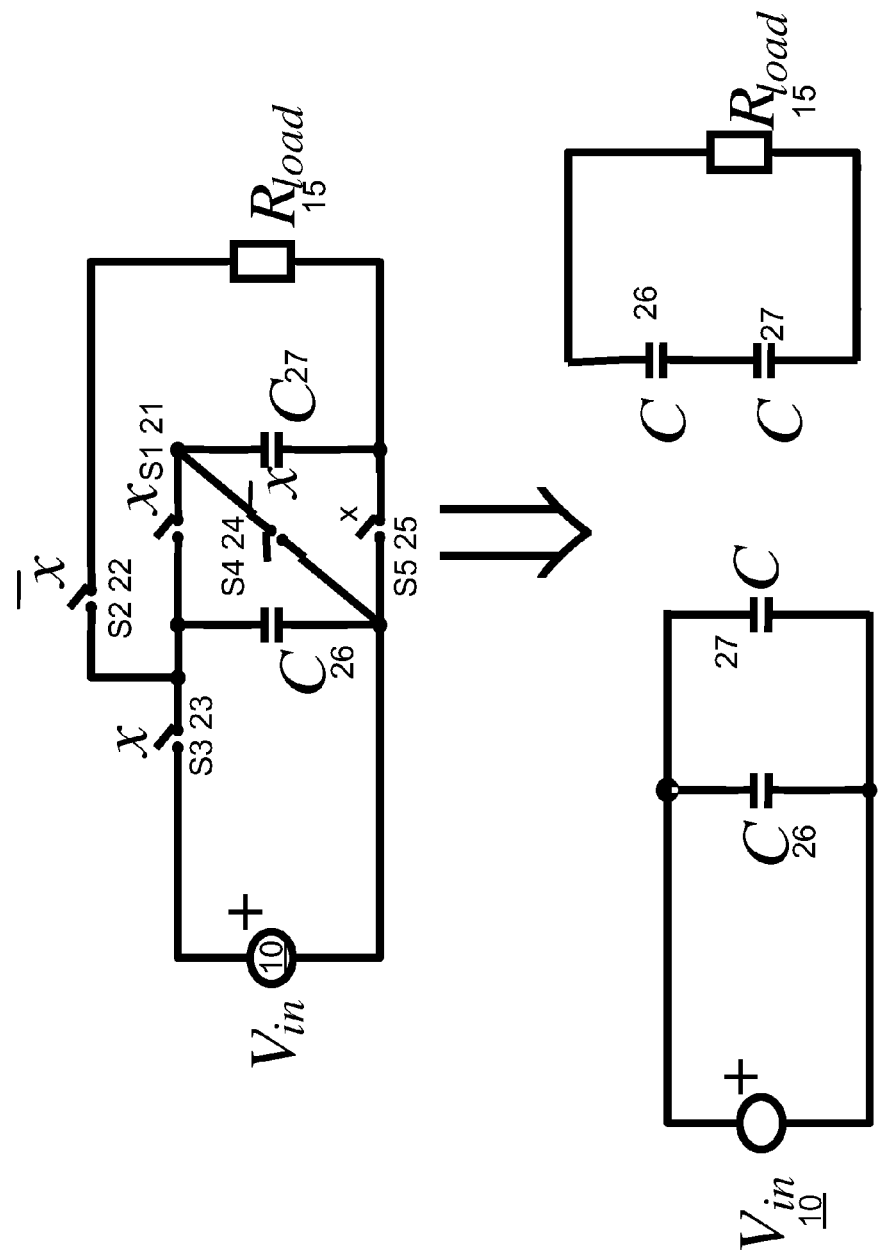
Figure 2B:
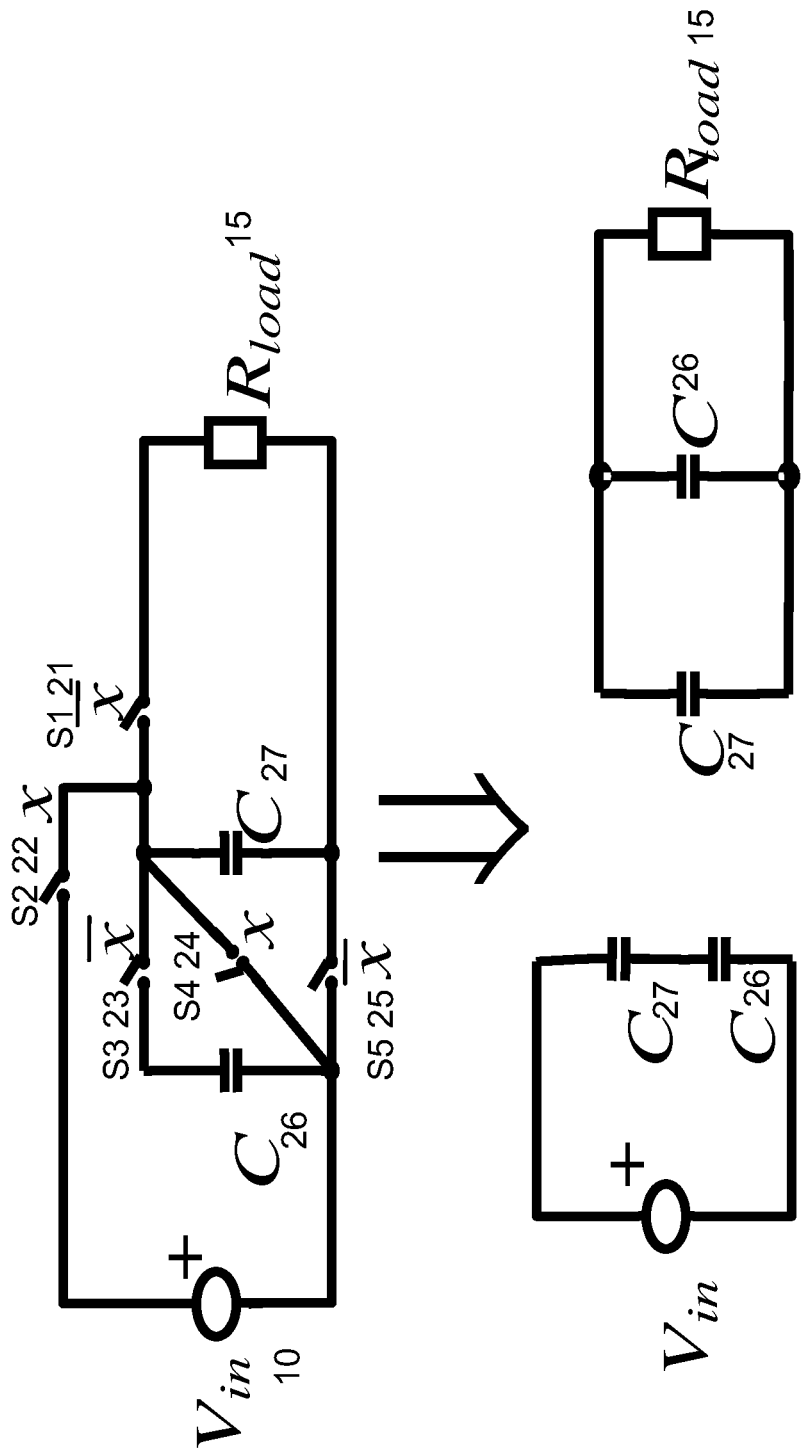

First a two capacitor array Series-Parallel topology is considered. These capacitors can both be charged from the source in series and discharged to the load in parallel, or be charged in parallel and discharged in series, and are depicted in FIG. 2a and FIG. 2b. Two capacitors C26 and C27 are connected to an array of switches S1-S5 21-25 and are controlled by a control unit (not shown).

The connectivity of various components of the circuits of FIG. 2a is illustrated in the following table:

| | First end | Second end | Control signal |
|---|---|---|---|
| Voltage supply 10 | First end of S1 | Second end of C26, first end of S5 and second end of S4 | |
| S1 21 | Voltage supply | First end of S2, C26 and S3 | X |
| S2 22 | Second end of S1, first end of C26 and S3 | First end of load | $\bar{x}$ |
| S3 23 | First end of S2 and C26, second end of S1 | First end of C27 and S4 | X |
| S4 24 | First end of S3 and C27 | Second end of C26, first end of S5 | $\bar{x}$ |
| S5 25 | Second end of C26 and S4 | Second end of C27 and load | X |
| C26 | First end of S2 and S3, second end of S1 | Second end of voltage supply and S4, first end of S5 | |
| C27 | Second end of S3 and first end of S4 | Second end of voltage supply and s5 | |
| Load 15 | Second end of S2 | Second end of C27 and S5 | |

The connectivity of various components of the circuits of FIG. 2b is illustrated in the following table:

| | First end | Second end | Control signal |
|---|---|---|---|
| Voltage supply 10 | First end of S2 | Second end of C26, S4 and first end of S5 | |
| S1 21 | Second end of S2 and S3, first end of C27 and S4 | First end of load | $\bar{x}$ |
| S2 22 | Supply voltage | Second end of S3, first end of C27, S1 and S4 | X |
| S3 23 | First end of C26 | First end of C27, S1 and S4, second end of S2 | $\bar{x}$ |
| S4 24 | First end of C27 and S1, second end of C3 | Second end of C26, first end of S5 | X |
| S5 25 | Second end of C26 and S4 | Second end of C27 and load | $\bar{x}$ |
| C26 | First end of S3 | Second end of voltage supply and S4, first end of S5 | |
| C27 | Second end of S2 and S3, and first end of S1 and S4 | Second end of load and S5 | |
| Load 15 | Second end of S1 | Second end of C27 and S5 | |

The input and output voltages are discontinuous in the presented topologies. Input and output external capacitors can be added to eliminate this discontinuity. Otherwise, each capacitor can be constructed as dual capacitor configuration (see: reference [14]).

In the case described in FIG. 2a, the energy conservation can be written as:

$$V_{in}^2 \cdot 2C = V_{out}^2 \cdot \frac{1}{2}C \qquad (1)$$

$$\frac{V_{out}}{V_{in}} = 2$$

It is noted that in the case shown in FIG. 2b the voltage ratio is 0.5.

Figure 3:
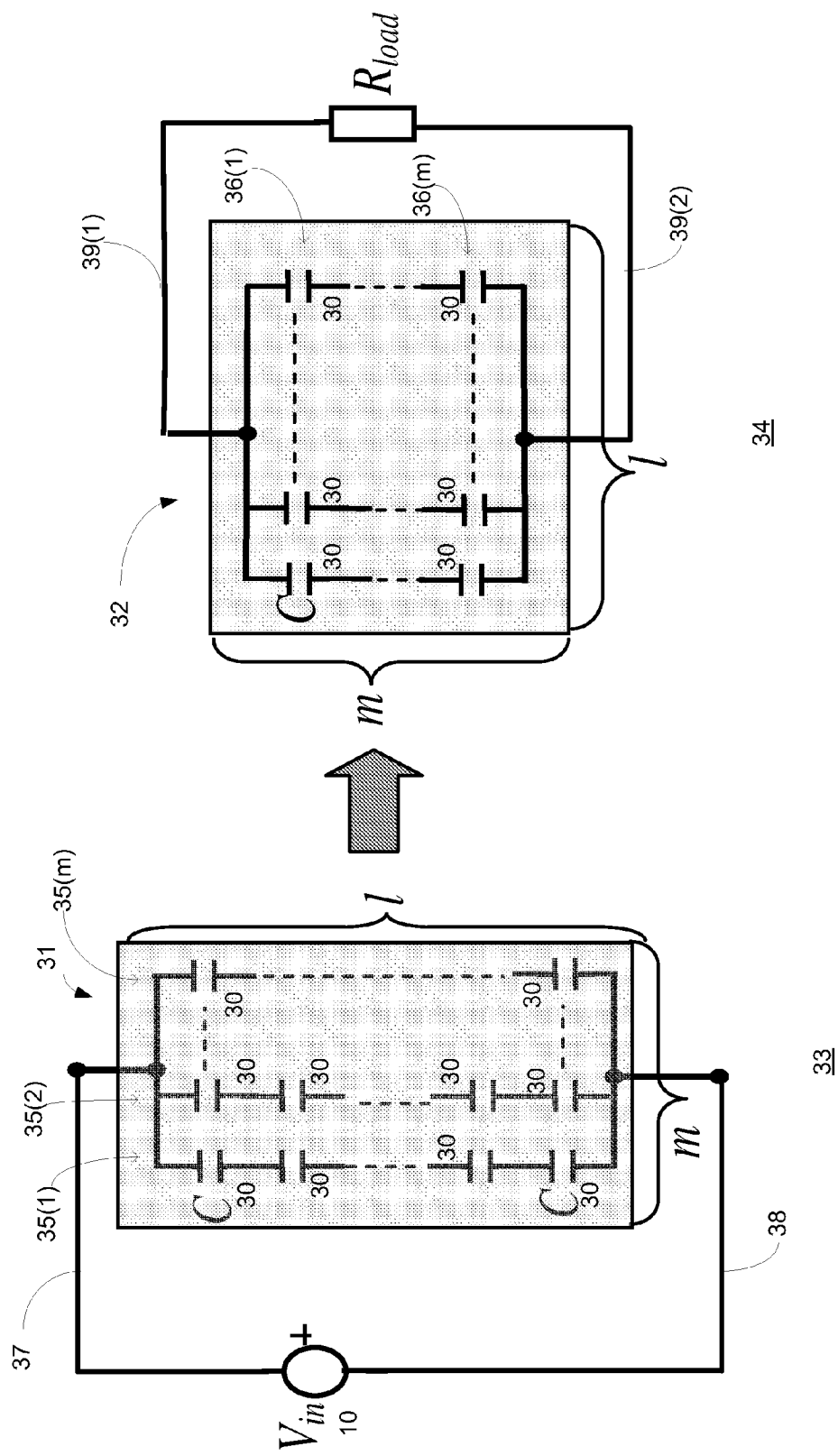

This simple Series-Parallel example of two capacitors can be generalized to an l-by-m matrix of capacitors, as shown in FIG. 3.

FIG. 3 illustrates two configuration of a matrix of switches and capacitors. The left side of FIG. 3 illustrates a charging configuration 33 in which m branches 35(1)-35(m)

are connected in parallel to each other—between two input ports 37 and 38—and in parallel to the voltage supply 10. Each of these branches is illustrated as including l serially connected capacitors (C30).

The right side of FIG. 3 illustrates a discharging configuration 34 in which m elements 36(1)-36(m) are connected in a sequential manner to each other—between two input ports 37 and 38. Each of these elements is illustrated as including l capacitors (C30) that are connected in parallel to each other.

The matrix of capacitors includes internal switches and with a suitable control of the switches the circuit will have two transposed phases. In this case the transfer ratio, M, is given by:

$$M = \frac{m}{l} \quad (2)$$

In (2), l is the number of series capacitors in the charging state and m is the number of parallel branches (m will be the number of series capacitors in the discharge state of the circuit).

The general capacitor matrix, as shown in FIG. 3, introduces versatility in the transitions between input and output. For example, 12 capacitors can be organized as 1 over 12 to give 12 or $\frac{1}{12}$ transmission (depending on the constellation at the charging and discharging states, as mentioned above), or 2 over 6 for a 3 or $\frac{1}{3}$ transmission and 3 over 4 for 1.33 or 0.75 transmission, etc. An increase of the capacitors number results in a large variety of transmissions.

The complexity of this topology is in the large number of capacitors and the number of switches required for controlling the switching of the requested topology between the charging and discharging states.

The number of the DC voltage ratios possibilities for a given matrix of capacitors equals the number of divisors that can be found for the integer number of capacitors.

The sum of positive divisors function $\sigma_\alpha(n)$ is defined as the sum of the $\alpha^{th}$ powers of the positive divisors of n, namely:

$$\sigma_\alpha(n) = \sum_{d|n} d^\alpha \quad (3)$$

Where n is an integer representing the number of capacitors in a matrix.

The divisor function $\sigma_0(n)$ counts the number of divisors of an integer number n (see: reference [15]. For example, the divisor function of 1 is: $\sigma_0(1)=1$ and the Divisor function of 6 is: $\sigma_0(6)=4$ (1,2,3,6) and so on.

In Matrix topology where a matrix is assembled of L capacitors, the number of voltage ratio possibilities is the sum of all divisor functions, $\sigma(L)$, equal to or less than L. Namely:

$$\sigma(L) = \sum_{n=1}^{L} \sigma_0(n) = \sum_{n=1}^{L} \sum_{d|n} d^0 \quad (4)$$

Figures 4A, 4B:
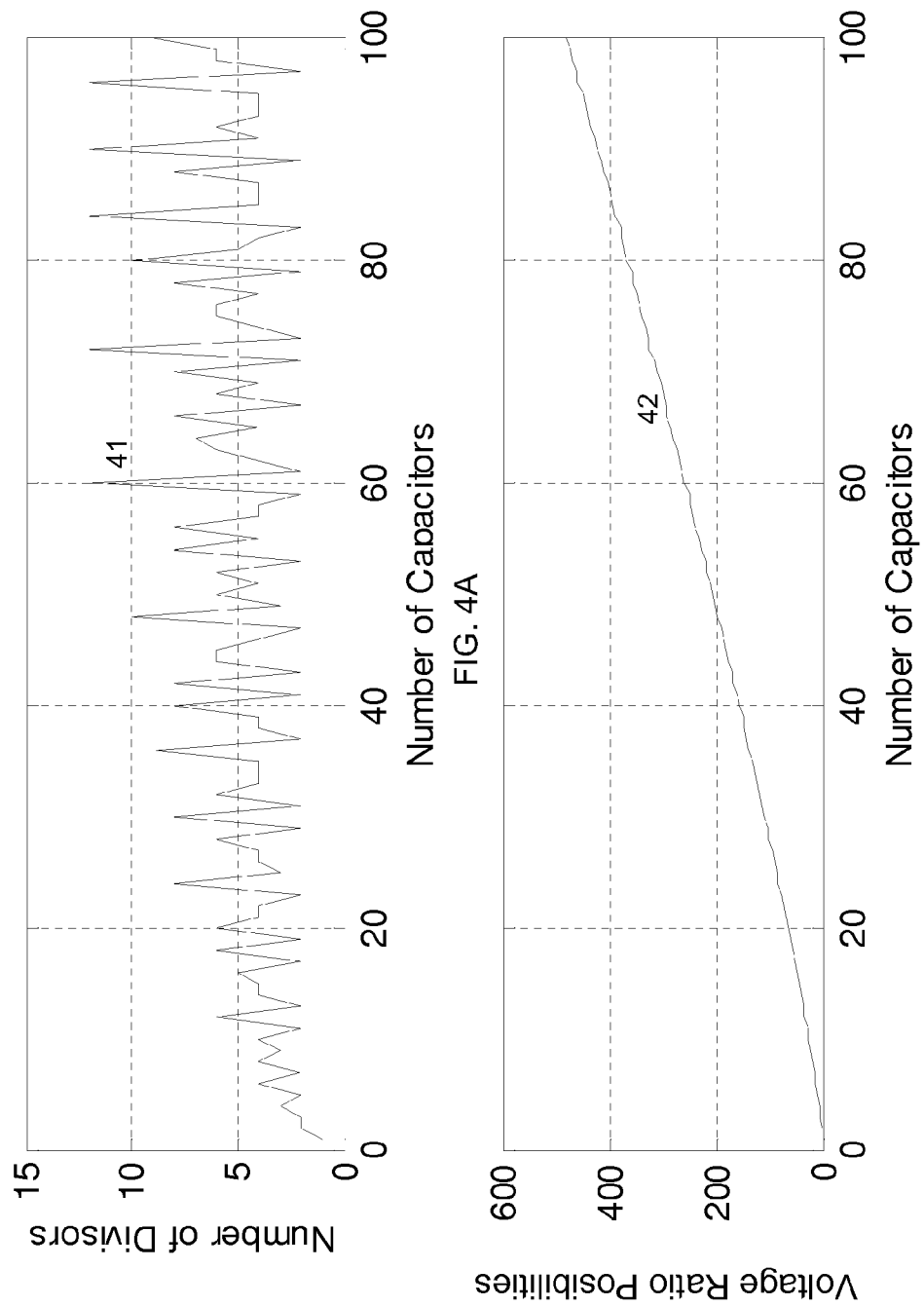
FIGS. 4A and 4B illustrates relationships between number of capacitors, number of divisors and voltage ratio possibilities.

The divisor function of matrices which are composed of up to a 100 capacitors is shown in FIG. 4a (illustrated by curve 41) and the function that represents the number voltage ratio possibilities (4), is shown in FIG. 4b—and illustrated by curve 42.

The divisor function is changing rapidly, as expected from divisors of integers. The voltage ratio possibilities function of FIG. 4b is a monotonically increasing function. For a matrix of 100 capacitors there are up to 482 possibilities of voltage ratios. The actual number is lower due to the fact that the same voltage ratio can be attained in various configurations. Therefore, the function in FIG. 4b is the higher boundary of these possibilities.

Accuracy and Fine Tuning

It was shown that the matrix topology has the possibility for versatile voltage ratios. This versatility yields a topology with a better accuracy in comparison with other conventional topologies. Accuracy gives the ability to get precisely, or at least very close, to any desired fixed voltage ratio value. If the number of capacitor is not limited, theoretically the accuracy can get to any desired value. A theoretical test case for comparing the various topologies presented in this paper is a case where a difficult DC/DC voltage ratio is required, such as 2.2. In this case, a matrix of m=22 and l=10 (a total of 220 capacitors) is the solution. This value is theoretically achieved in a 100% accuracy.

The case is getting more complicated if regulation is required. In this case the matrix needs to change to a one that suits the new value. This characteristic is called Fine Tuning. Matrix configuration has the ability for fine tuning by changing the size of the matrix. In the above example, if for regulation purposes the 2.2 voltage ratio needs to change to 2.25, the required matrix will be m=45 and l=20 (a total of 900 capacitors). These numbers are obviously impractical for implementation but this example emphasizes the presented idea of accuracy and fine tuning in matrix based topologies.

Partial Arbitrary Matrices

The matrix topology requires a large number of capacitors and switches; therefore it is too complex for implementation and integration of converters, being more theoretical than practical. Further studying of the matrix topology yields to the conclusion that it is a singular case of a more general and more flexible topology.

The topology presented next is the Partial Arbitrary Matrix Topology (PAMT). This topology is based on a concept in which for achieving a certain input to output voltage ratio, partial matrices and arbitrary rectangular based arrangements of equally capacitance valued capacitors can be used.

Figures 5A, 5B:
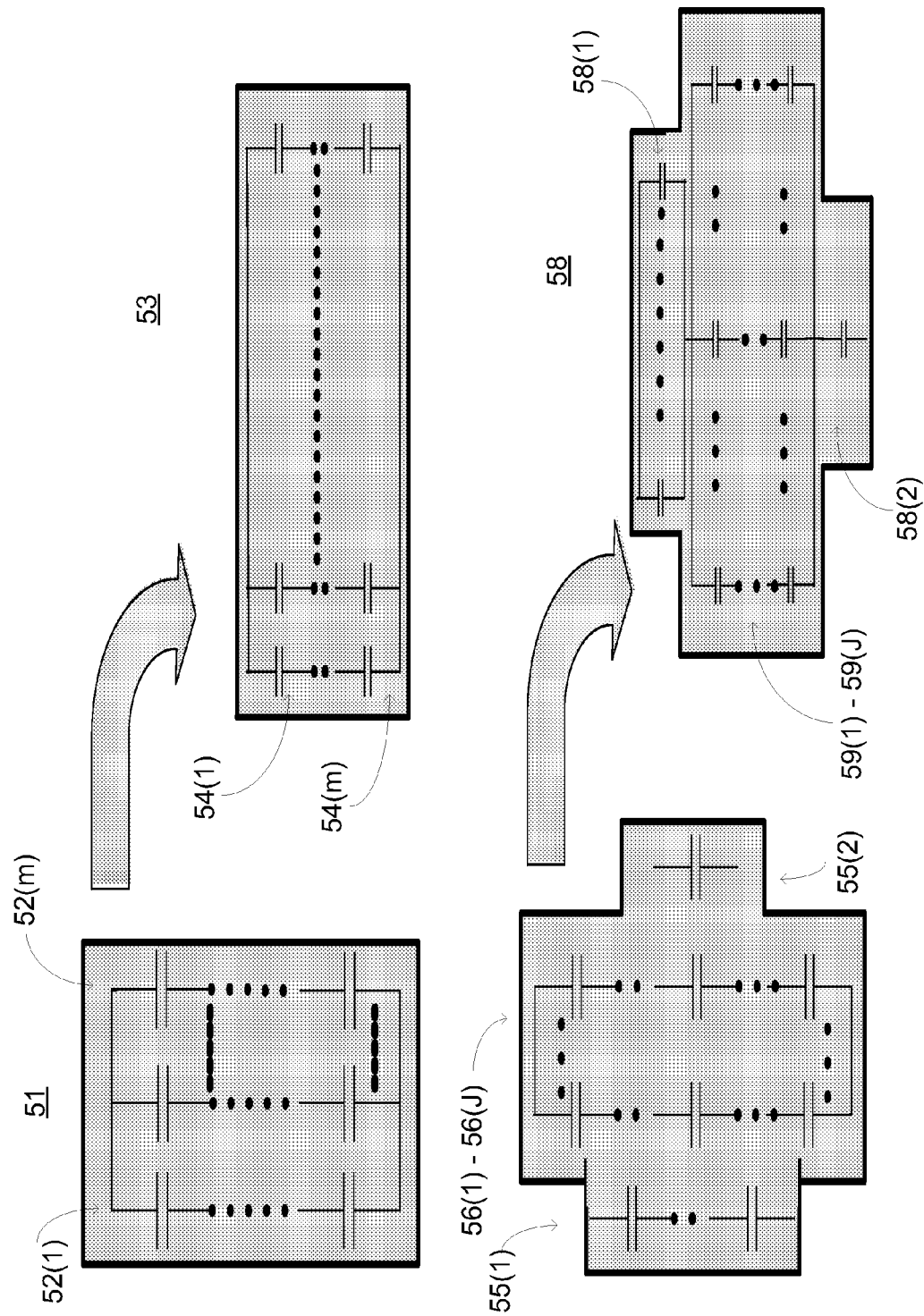
FIGS. 5A, 5B, 6A, 6B, 7A, 7B, 7C, 7D, 8A, 8B, 20, 21, 22, 24, 25, 26 and 27 illustrate various circuits, charging and discharging configurations according to various embodiments of the invention.

As shown in FIG. 5a, a matrix can be charged at the charging state and at the discharging state the topology is transformed, as mentioned above. The left side of FIG. 5a illustrates a charging configuration 51 in which m branches 52(1)-52(m) are connected in parallel to each other. Each of these branches is illustrated as including l serially connected capacitors. The right side of FIG. 5a illustrates a discharging configuration 53 in which m elements 54(1)-54(m) are connected in a sequential manner to each other. Each of these elements is illustrated as including l capacitors that are connected in parallel to each other.

The same idea can be implemented to non-rectangular matrices. Namely, any discrete number of equally capacitance valued capacitors can be used to achieve any desired DC/DC voltage ratio. In FIG. 5b the capacitors are connected in an arbitrary shape. The left side of FIG. 5b illustrates a charging configuration 55 while the right side of FIG. 5b illustrates a discharging configuration 58.

The charging configuration 55 includes branches 55(1), 56(1)-56(J) and 55(2) that are coupled in parallel to each other. Branch 55(2) has a single capacitor, branch 55(1) has a first number of serially connected capacitors and each of branches 56(1)-56(J) has a second number of serially connected capacitors, whereas the first number is between one and the second number.

The discharging configuration 58 includes elements 58(1), 59(1)-59(J) and 58(2) that are coupled in a serial manner to each other. Element 58(2) has a single capacitor, element 58(1) has a first number of parallel connected capacitors and each of elements 59(1)-59(J) has a second number of parallel connected capacitors, whereas the first number is between one and the second number.

For conservation of charge and for eliminating any unacceptable electrical connections (such as the parallel connection of two capacitors charged at different voltages), four convections should be followed:

(A) At the charging state, when the capacitors are connected to the DC source. The capacitors should be connected as a shunt connection of branches. Each branch consists of any number of series capacitors.

(B) The discharging state is a dual connection to the charging state. That is the capacitors should be connected as series elements. Each element consists of a number of capacitors in parallel.

(C) The number of parallel branches at the charging state is equal to the number of the series elements in the discharging state.

(D) The number of capacitors in parallel at the discharge state is equal to the number of series capacitors in a branch at the charging state.

It is noted that such a transformation from input to output of partial and arbitrary shaped matrices from series to parallel, and vice versa, may be achieved by transferring a given topology through a gyrator (see: references [16]-[19]).

The DC/DC Input/Output Voltage Ratio

Figures 6A, 6B:
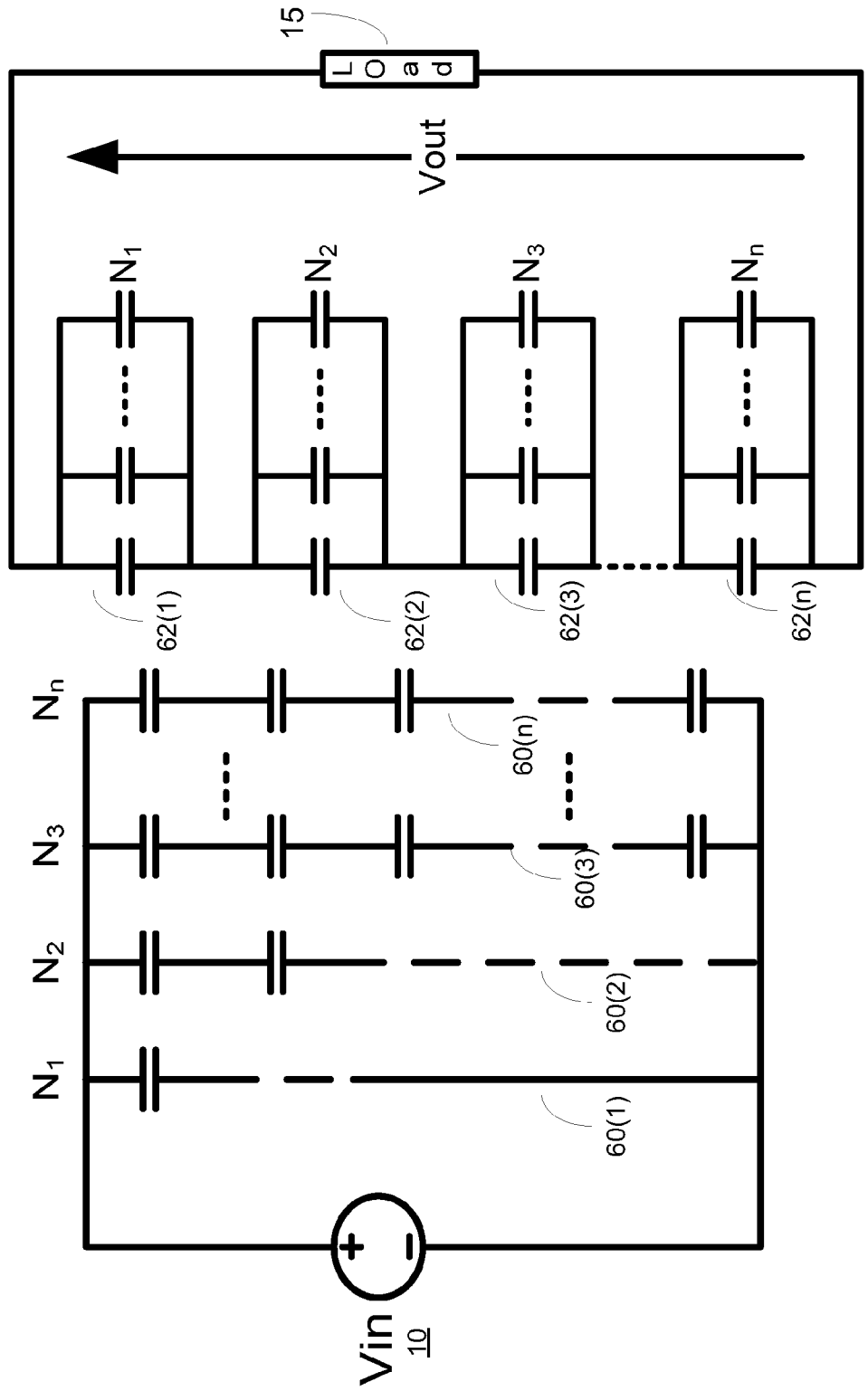

FIGS. 6a and 6b illustrates a charging configuration and a discharging configuration of a PAMT is presented. It is noted that the number of capacitors in each branch of FIG. 6a and each element of FIG. 6b is denoted by N with a complementary index (j) that indicates the branch number. This number is an integer and may vary from 1 to L, where L is any finite integer.

The charging configuration 63 includes n branches 60(1)-60(n) that are coupled in parallel to each other. Each branch includes one or more serially connected capacitors. The j'th branch includes Nj serially connected discharging configuration 64 includes n elements 62(1)-62(n) that are serially connected to each other. Each branch includes one or more parallel connected capacitors. The j'th element includes Nj parallel connected capacitors.

At the charging state of FIG. 6a, each capacitor at the j branch is charged to a voltage $V_{Cj}$ of:

$$V_{cj} = \frac{1}{N_j} V_{in} \qquad (5)$$

The same expression can be written for each capacitor in any given branch, taking into consideration the number of capacitors in that branch.

Consequently, at the discharging state, the equally charged series capacitors in a branch are connected in parallel. Therefore, the voltage of that series element of paralleled capacitors is equal to the voltage of a single capacitor at the charging state, as in (5). Additionally, the output voltage at the discharging state is a sum of all voltages of all series elements in FIG. 6b. The output voltage can be written as:

$$V_{out} = V_{in}\frac{1}{N_1} + V_{in}\frac{1}{N_2} + \ldots + V_{in}\frac{1}{N_n} \qquad (6)$$

Where each of the $N_1, N_2, \ldots, N_n$ is an integer that can obtain any value at a range of 1 to L.

Then for a given number of capacitors in a PAMT configuration, the DC input/output voltage ratio is:

$$M = \frac{V_{out}}{V_{in}} = \sum_{j=1}^{n} \frac{1}{N_j} \qquad (7)$$

Figure 8A:
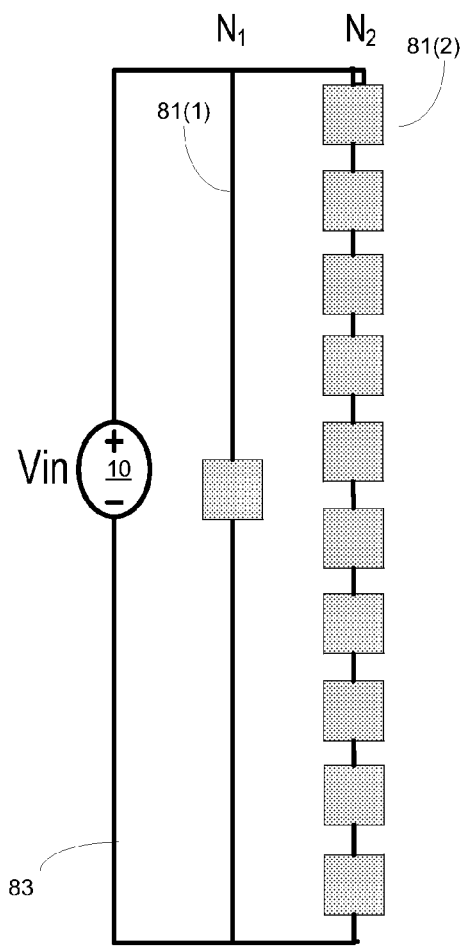
Figure 8A:
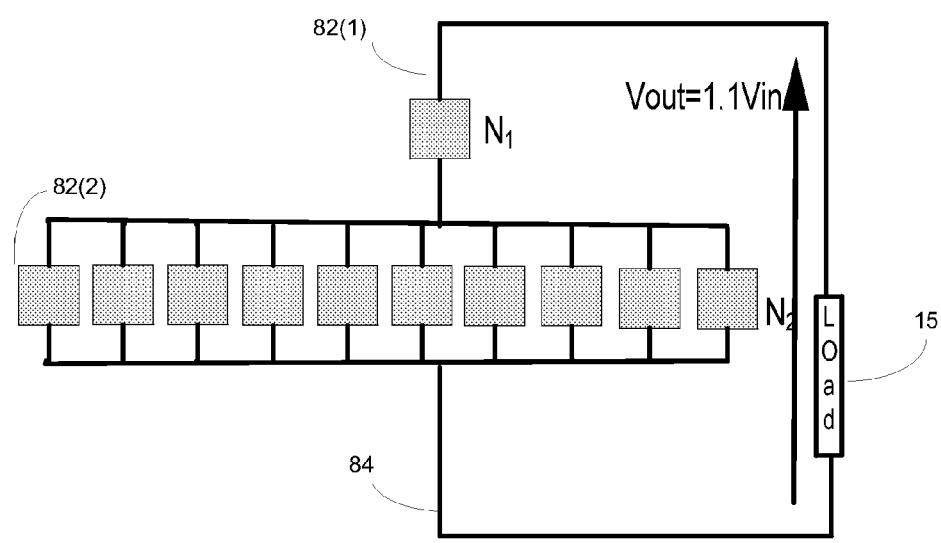

FIG. 8a illustrates a charging configuration in which two branches 81(1)-81(2) are connected in parallel to the supply voltage 10. The numbers of the serially connected capacitors of these branches are N1=1, N2=10, although N2 may differ than 10. FIG. 8a also illustrates a discharging configuration in which two elements 72(1)-72(2) are connected in a serial manner to the supply voltage. The numbers of the parallel connected capacitors of these elements are N1=1, N2=10, although N2 may differ than 10.

Accuracy and Fine Tuning in PAMT

Various ratios can be provided in various manners, including but not limited to bypassing or disconnecting capacitors.

Figure 7A:
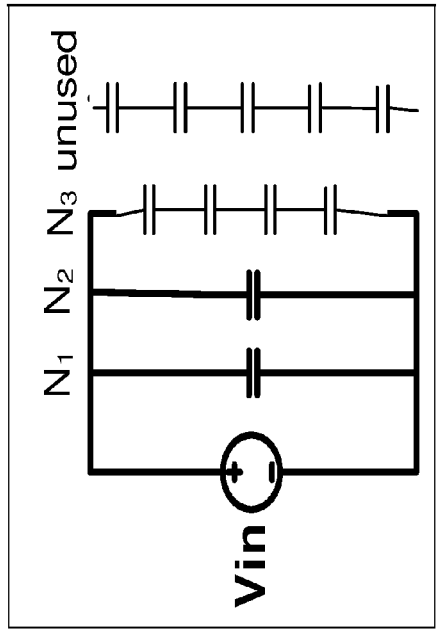

FIG. 7a illustrates a charging configuration in which three branches 70(1)-70(3) are connected in parallel to the supply voltage while another (optional) branch 70(4) is disconnected. The numbers of the serially connected capacitors of these branches are N1=1, N2=1 and N3=5. FIG. 7c illustrates a discharging configuration in which three elements 71(1)-71(3) are connected in a serial manner to the supply voltage while another (optional) branch 70(4) (not shown in FIG. 7c) is bypassed. The numbers of the parallel connected capacitors of these elements are N1=1, N2=1 and N3=5, although other values of N1-N4 may be provided. These configurations provide a ratio of 2.2.

Figure 7B:
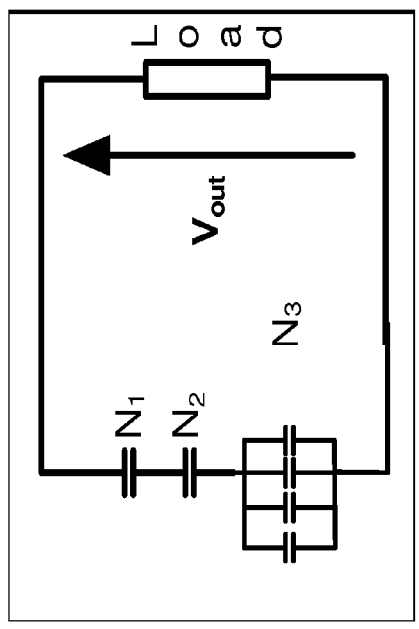
Figure 7C:
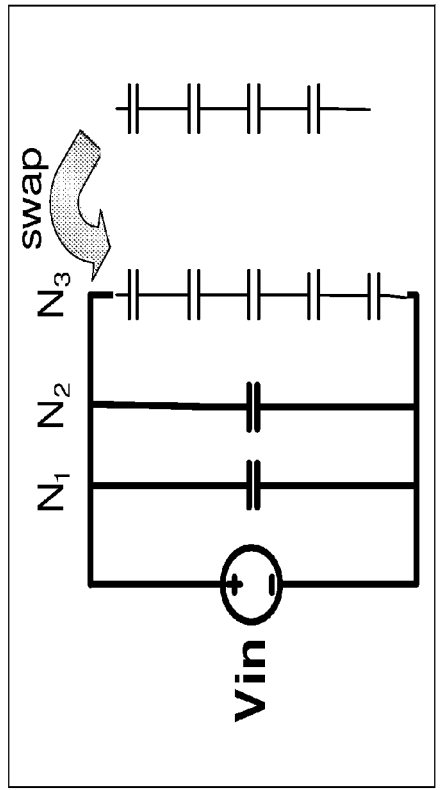
Figure 7D:
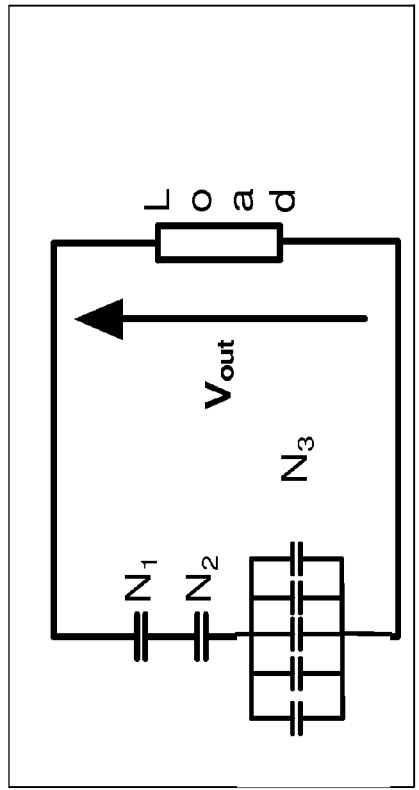

FIG. 7b illustrates a charging configuration in which three branches 70(1), 70(2) and 70(4) are connected in parallel to the supply voltage while another (optional) branch 70(3) is disconnected. The numbers of the serially connected capacitors of these branches are N1=1, N2=1 and N4=4. FIG. 7c illustrates a discharging configuration in which three elements 71(1), 71(2) and 71(4) are connected in a serial manner to the supply voltage while another (optional) branch 71(3) (not shown in FIG. 7d) is bypassed. The numbers of the parallel connected capacitors of these elements are N1=1, N2=1 and N4=4, although other values of N1, N2 and N4 may be provided. These configurations provide a ratio of 2.25.

The arbitrary (or rather non-rectangular) matrixes provide a ratio of either one of 2.25 and 2.25 with only seven capacitors. The arbitrary (or rather non-rectangular) matrixes provide both ratios of 2.25 and 2.25 with only 11 capacitors. It is noted that a 2.2 ratio may require a rectangular matrix that includes 220 capacitors.

The configurations illustrates above allow to fine tune the ratio.

The same fine tuning example requires here an addition of four capacitors. Namely, eleven capacitors are required (compared with 990 in the rectangular matrix topology) for achieving the fixed value accuracy and the Fine Tuning capability of the mentioned example.

In general, multiple branches and/or elements can be bypassed or disconnected.

The General Transposed Series-Parallel Topology (GTSP)

The rectangular matrix topology requires a large number of capacitors and switches. PAMT requires a much less number of capacitors, but when regulation and fine tuning is required, the number of capacitors can rise. Studying further the rectangular matrix topology and PAMT, yields to the conclusion that a more general and more flexible topology can be derived.

The GTSP topology presented next is a solution for achieving an integrated converter with a very large number of input/output DC voltage conversion ratios and the ability to multiply and divide by integers, as well as fractional multiplications. Moreover, this topology has Fine Tuning capabilities for regulation purposes with a minimal addition of capacitors. The topology is based on a concept in which for achieving a certain input to output voltage ratio, partial matrices and arbitrary rectangular based arrangements of equal capacitance valued capacitors can be used exactly, as was explained in the PAMT. The only difference is that the arbitrary matrices are constructed out of a bank of capacitors. Each capacitor can be connected individually in any column.

Figure 8B:
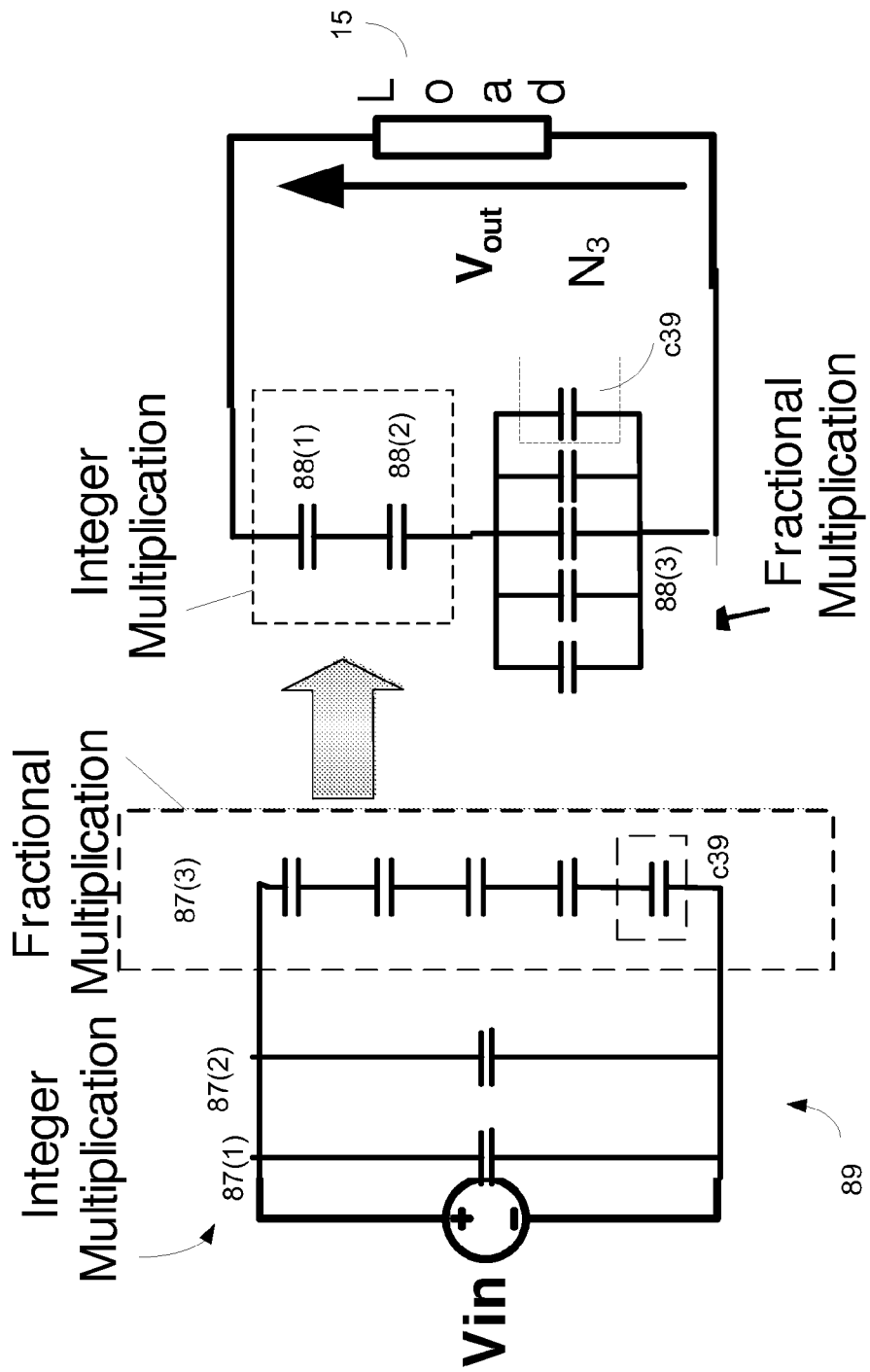

Referring to the 2.2 voltage ratio example, the GTSP topology, shown in FIG. 8b, may be the same as the PAMT of FIG. 7a and FIG. 7c but includes bypass and/or disconnect capabilities of portions of elements and/or branches.

FIG. 8b illustrates a charging configuration 89 in which three branches 87(1)-87(3) are connected in parallel to the supply voltage 10 and a single capacitor C89 of the third branch 87(3) can be bypassed. The numbers of the serially connected capacitors of these branches are N1=1, N2=1 and N3=5 (including C89).

FIG. 8b also illustrates a discharging configuration 88 in which three elements 88(1)-88(3) are connected in a serial manner to the load 15 while capacitor C89 is disconnected. The numbers of the parallel connected capacitors of these elements are N1=1, N2=1 and N3=5 (including C89).

It is noted that other values of N1-N3 may be provided, that the number of branches and elements may differ from three and that other capacitors can be bypassed (in addition to C89 or instead of C89).

The columns 87(1) and 87(2) that include one capacitor ($N_1$=1 and $N_2$=2) may yield an integer multiplication. The columns 87(3) that have more than one capacitor yield the fractional multiplication. Therefore, a combination of the two provides any required voltage ratio according to equation (7).

The PAMT topology may differ from the GTSP topology by the number of capacitors required for Fine Tuning.

A 2.2 voltage ratio can be changed to a 2.25 ratio by bypassing (or not) C89. Therefore, for the assumed example, only seven capacitors are needed for the accuracy and fine tuning.

The ability to describe the topology as a connection between discrete capacitors yields a topology with a very large amount of voltage ratios with a reduced number of capacitors. This leads to accuracy and Fine Tuning capabilities that are only known in inductance based converters.

Accordingly—instead of bypassing or disconnecting entire branches (or elements) only a portion of a branch (or a portion of an element) can be bypassed or disconnected. The bypass and disconnection may be implemented by switches.

DC/DC Input/Output Voltage Ratios Possibilities

The configuration of FIGS. 6a-6b may also be viewed as a case of GTSP. It is versatile and yields a large number of input/output DC voltage ratios. Note that for any number L of capacitors, it is possible by controlled switching to use any number less or equal to L capacitors.

Examining the number of the DC voltage ratios, possibilities for a given number of capacitors show resemblance to partition functions in number theory. A partition function P(n) gives the number of partitions of a number n as a sum of smaller integers regardless of order (see: reference [20]). For the partition function of 1 is: P(1)=1, the partition function of 2 is: p(2)=2 and p(3)=(3); p(4)=5; p(5)=7; p(6)=11 . . . p(10)=42 and so on.

In the case of GTSP that is constructed out of K capacitors, the number of voltage ratio possibilities is the sum of all partition functions, $P_K$, equal to or less than K. Namely:

$$P_K = \sum_{n=1}^{K} p(n) \quad (8)$$

The partition functions p(n) can themselves be calculated by using the greedy algorithm; (see: reference [15]), or from the generating function based on the reciprocal of the Euler's function (see: reference [20]):

$$\sum_{n=0}^{\infty} p(n)x^n = \prod_{k=1}^{\infty} \left(\frac{1}{1-x^k}\right) \quad (9)$$

Figures 9A, 9B:
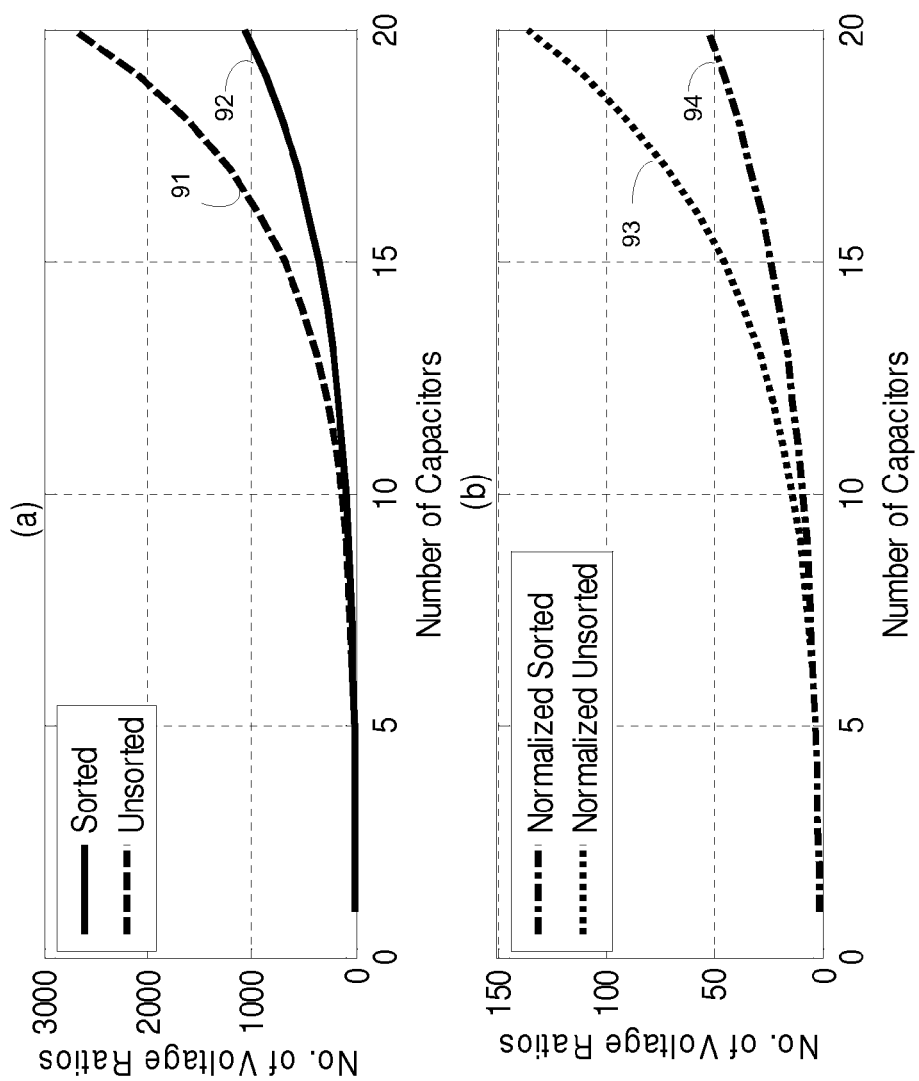
FIGS. 9A, 9B, 10, 11A, 11B, 11C, 12, 13, 14, 15, 16, 17, 18, 19 and 23 illustrate various simulation results and circuit models according to various embodiment of the invention.

In FIG. 9a the number of possible DC/DC voltage ratios is presented with respect to the number of capacitors. It can be seen that with 20 capacitors the number of possibilities reaches a vast number of over 2,800 ratios (curve 91 of FIG. 9a). Checking the actual voltage ratio yields that there are ratios that repeat themselves in various constellations of capacitors. After sorting and eliminating repeating ratios, curve 92 in FIG. 9a shows the number of different ratios possible. At 20 capacitors there are still over 1000 possibilities. Moreover, these reported repetitions might be useful in the future when transferring from one ratio to another. In this case, for energy consideration and optimization of the control, it might be useful to have a few configurations to choose from.

FIG. 9b shows normalized results for the case in which the number of possibilities are divided by the number of capacitors, the results show that even when normalized, the graph is still exponentially increased. Curve 93 illustrates the number or ratios while curve 94 illustrates the number of different ratios. Therefore, adding capacitors to the system increases the number of ratio possibilities in an exponential manner.

Figure 10:
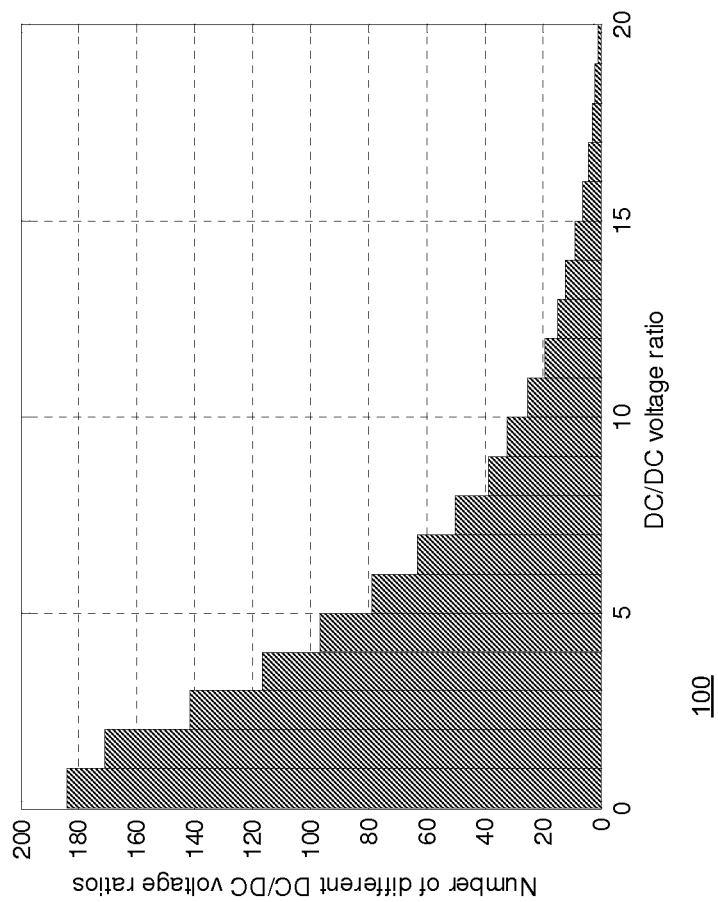

An important characteristic of GTSP is the ability to fine tune the voltage ratio. FIG. 10 shows a histogram 100 that sorts the total different voltage ratios. It can be seen that only one configuration can make a voltage ratio of 20, but there are 184 configurations that give various voltage ratios between 0 and 1 and 171 configurations that give various voltage ratios between 1 and 2 and so on: the number drops in a logarithmical manner in the higher regions. This means that after reaching the rough voltage ratio, fine tuning can be established.

Accuracy and Fine Tuning Test Case

As a test case a 1.75 DC/DC voltage ratio is examined. An input voltage with up to ±15% deviation around a nominal value is considered. For appropriate regulated output voltage, the converter needs to have 1.5 to 1.9 DC/DC voltage ratios. Calculating the sum of partitions and the possible voltage ratios in the above mentioned interval for 10, 15 and 20 capacitors is presented in FIG. 11.

Figures 11A, 11B, 11C:
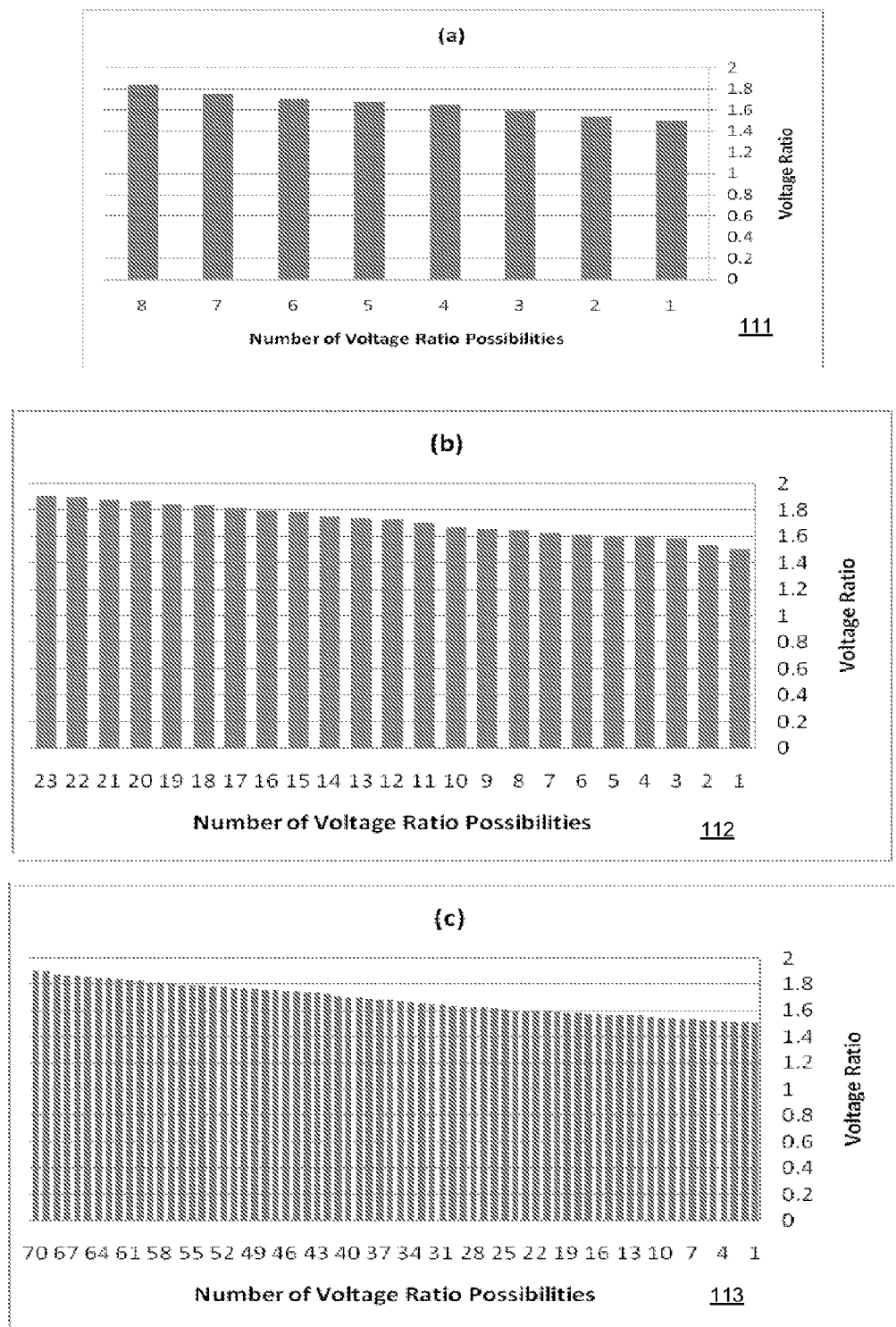

The results show that for 10 capacitors, as shown in FIG. 11a, there are 8 different DC/DC voltage ratios in the interval of 1.5 to 1.9. The average voltage difference between two values is 0.0476. In the case of 15 capacitors (FIG. 11b), there are 23 different ratios in the mentioned interval with an average difference of 0.0182 between two values. In the last case of 20 capacitors (FIG. 11c), the 70 different ratios are with an average deviation of 0.0058 between two values.

For practical cases of switched mode power supplies, it is sufficient that the ripple Δv is:

$$\frac{\Delta v}{V_{out}} < 1\% \quad (10)$$

It seems that the "fine tuning" of the transfer ratio should not be more precise than the required ripple; therefore a 20 capacitor converter seems to be the appropriate topology for achieving accuracy. For a more rigid operating condition, an addition of capacitors should be considered. A note should be taken that each extra capacitor inserts an exponential number of possibilities, as described in (8) and FIG. 7.

The Effect of Dispersion of Capacitance Value Parameter, on the Switching Frequency and Converter Losses The analysis in the previous sections takes into consideration ideal components. Namely, all capacitors have the same capacitance value and the switches are ideal.

In manufacturing an identical capacitor, due to practical manufacturing methods, each capacitor's value can be considered to be C+ΔC. Moreover, ΔC is distributed normally, namely the normalized variable ΔC/C can be written as:

$$\frac{\Delta C}{C} \; N(0, \sigma^2) \quad (11)$$

where ΔC/C<<1 and $\sigma^2$ is the variance and depends on the accuracy of the manufacturing process.

The first branch of capacitors in FIG. 6a consists of $N_1$ capacitors connected in series. The inverse total capacitance of that branch is:

$$\frac{1}{C_{T1}} = \underbrace{\frac{1}{C} + \frac{1}{C} + \ldots + \frac{1}{C}}_{N_1} = \frac{N_1}{C} \quad (12)$$

Subsequently, the total capacitance of the GTSP configuration observed by the source is:

$$C_{Tot} = C \sum_{j=1}^{n} \frac{1}{N_j} \quad (13)$$

At the end of the charging state the voltage across each capacitor in the first branch is:

$$V_{C1} = \frac{V_{in}}{N_1}\left[1 - \frac{\Delta C}{C}\right] \quad (14)$$

Therefore, the voltage across any capacitor in any branch j in the GTSP topology is:

$$V_{Cj} = \frac{V_{in}}{N_j}\left[1 - \frac{\Delta C}{C}\right] \quad (15)$$

The output voltage drop at the beginning of the discharge state for capacitors in the first branch is:

$$\frac{V_{in}}{N_1} = V_{out1} \quad (16)$$

Therefore, the energy loss in each capacitor with capacitance of C+ΔC at the first branch due to charging is:

$$\Delta w = \frac{1}{2}(C + \Delta C)\left[\left(\frac{V_{in}}{N_1}\left[1 - \frac{\Delta C}{C}\right]\right)^2 - \left(\frac{V_{in}}{N_1}\right)^2\right] \quad (17)$$

The mean is given by:

$$|E(\Delta w)| = \frac{1}{2}C\left(\frac{V_{in}}{N_1}\right)^2 \sigma^2 \quad (18)$$

The total energy loss of all capacitors with capacitance of C+ΔC due to discharging at the first row is:

$$\Delta w_{Tot1} = \frac{1}{2}C\frac{V_{in}^2}{N_1}\sigma^2 \quad (19)$$

In the same manner, the energy loss of all capacitors with capacitance of C+ΔC due to discharging all rows is:

$$\Delta w_{Totj} = \frac{1}{2}CV_{in}^2\sigma^2 \sum_{n=1}^{N} \frac{1}{N_n} \quad (20)$$

The absorbed power when the switching frequency is $f_{switch}$ is:

$$P_{mismatch} = \Delta w \cdot f_{switch} = \frac{1}{2}CV_{in}^2\sigma^2 f_{switch} \sum_{n=1}^{N} \frac{1}{N_n} \quad (21)$$

After a short period, the capacitors reach an average voltage Vj (this process consists of an energy loss of Δw), then the discharged state starts. In this state the capacitors of each branch are connected in parallel and all branches are connected now in series. The total output capacitance is:

$$\frac{1}{C_{Tot}} = \frac{1}{N_1 C} + \frac{1}{N_2 C} + \ldots + \frac{1}{N_n C} = \frac{1}{C}\sum_{j=1}^{n}\frac{1}{N_j} \qquad (22)$$

Under the assumption that the voltage is constant, namely, that the voltage drops very slightly, the current is then constant and is:

$$I_{dis} = \frac{P_{load}}{V_{in}\sum_{n=1}^{N}1/N_n} \qquad (23)$$

The voltage drop is then:

$$\Delta V_p = \frac{I_{dis}\cdot T_{switch}}{C_{Tot}} = \frac{P}{V_{out}}T\frac{1}{C}\sum_{j=1}^{n}\frac{1}{N_j} \qquad (24)$$

from (24) it is evident that:

$$\frac{\Delta V_p}{V_{out}} = \frac{P}{V_{out}^2 f}\frac{1}{C}\sum_{j=1}^{n}\frac{1}{N_j} \qquad (25)$$

Now the frequency is:

$$f_{switch} = \frac{P_{load}}{CV_{out}^2\left(\frac{\Delta V_p}{V_{out}}\right)}\sum_{j=1}^{n}\frac{1}{N_j} \qquad (26)$$

The output voltage in the GTSP topology is:

$$V_{out} = V_{in}\sum_{j=1}^{n}\frac{1}{N_j} \qquad (27)$$

Substituting (27) into (26) yields:

$$\frac{\Delta P_{mismatch}}{P_{load}} = \frac{1}{2}\left(\frac{V_{in}}{V_{out}}\right)^2 \sigma^2 \frac{\sum_{j=1}^{n}\frac{1}{N_j^2}}{\sum_{j=1}^{n}\frac{1}{N_j}}\left(\frac{V_{out}}{\Delta V_p}\right) \qquad (28)$$

From (28) it is evident that large parameter dispersion yields higher losses. Therefore, for integration it is crucial to lower this dispersion by an accurate production process. Since $\Delta V_P/V$ means losses as well, an optimum should be achieved.

It should be mentioned that when real capacitors are concerned the analysis will include energy losses due to the fact that the capacitors are not equally valued. This energy loss will be absorbed in the capacitors parasitic resistances which were neglected in order to simplify the analysis.

Small Ripple Analysis

The theory presented above takes into account that the switched capacitor converter is ideal, namely the presentation was based on the fact that the output power equals the input power, namely the maximum efficiency. Therefore, the converter is described as a two port Direct Coupled Transformer (DCT) and defined by the chain matrix:

$$[T] = \begin{bmatrix} A & B \\ C & D \end{bmatrix} = \begin{bmatrix} m & 0 \\ 0 & m^{-1} \end{bmatrix} \qquad (29)$$

When the system is not ideal, losses are introduced and the ideal system now becomes semi-ideal, (see: reference [21]).

The switching of capacitors results in high peak current pulses in the input of the circuit. To eliminate these current spikes, a small series resistance is introduced to the input of the circuit. The current now is restrained and the input current permutation is denoted as $\delta i_{in}$. Furthermore, the output voltage permutation (ripple) is denoted by $\delta v_{out}$, see FIG. 12.

Figure 12:
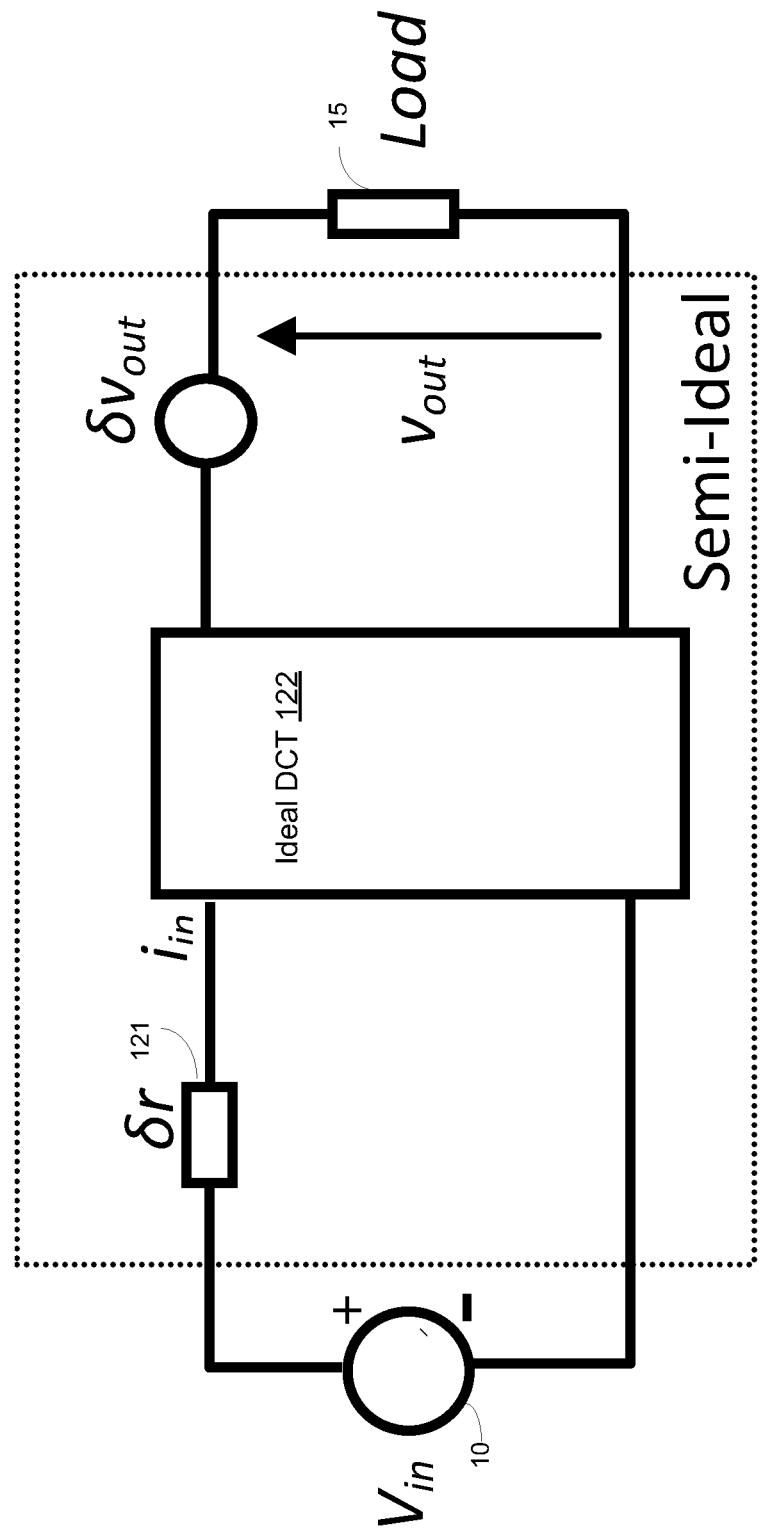

The model of FIG. 12 includes a voltage supply 10 having one end connected to an input port of an ideal DCT 122 and another end connected to a first end of $\delta i_{in}$ 121. The other end of $\delta i_{in}$ 121 is connected to another input port of the ideal DCT 122. An output port of the ideal DCT 122 is connected to one end of $\delta v_{out}$ 123 while another end of $\delta v_{out}$ 123 is connected to one end of load 15. The other end of load 15 is connected to another output port of the ideal DCT 122.

The input current and output voltage equations are then:

$$i_{in} = i^*_{in} + \delta i_{in}(t)$$

$$v_{out} = v^*_{out} + \delta v_{out}(t) \qquad (30)$$

where $i^*_{in}$ and $v^*_{out}$ are the rated input current and output voltage respectively.

For maintaining Semi-Ideal conditions, the output permutation $\delta v_{out}$ and the input current permutation $\delta i_{in}$, should comply with:

$$\frac{\delta i_{in}}{i_{in}} = \alpha(t) \qquad (31)$$

$$\frac{\delta v_{out}}{v_{out}} = \beta(t)$$

For realization of a Semi-Ideal system the following should be satisfied:

$$Q_{in}[1+\alpha(t)] = Q_{out}[1+\beta(t)]$$

when:

$$|\alpha(t)| \ll 1 \text{ and } |\beta(t)| \ll 1 \qquad (32)$$

in the case of (30) the equation is:

$$(i_{in} + \delta i_{in}(t))v_{in} = (v^*_{out} + \delta v_{out}(t))i_{out} \qquad (33)$$

The transfer ratio of the ideal DCT is:

$$m = \frac{i^*_{in}}{i_{out}} = \frac{v^*_{out}}{v_{in}} \qquad (34)$$

then from (33), (34) and (31) we derive:

$$\frac{(i^*_{in} + \delta i_{in}(t))}{i_{out}} = \frac{(v^*_{out} + \delta v_{out}(t))}{v_{in}} \qquad (35)$$

$$m[1 + \alpha(t)] = m[1 + \beta(t)]$$

Thus, the chain matrix is now:

$$[T] = \begin{bmatrix} m[1 + \alpha(t)] & 0 \\ 0 & \{m[1 + \beta(t)]\}^{-1} \end{bmatrix} \quad (36)$$

The [T] matrix of the approximated DCT can be split into two matrices as follows:

$$[T] = [M] + [A(t)] \quad (37)$$

$$[M] = \begin{bmatrix} m & 0 \\ 0 & m^{-1} \end{bmatrix}$$

$$[A] = \begin{bmatrix} m \cdot \alpha(t) & 0 \\ 0 & [m \cdot \beta(t)]^{-1} \end{bmatrix}$$

In (37), [M] is the matrix of an ideal DCT with the ideal transfer ration of n. The [A] matrix represents the variation of the input current and output voltage from their rated values, resulting from the imbalanced input/output power of the Semi-Ideal system. If one of the parameters (input current or output voltage permutation) in the [A] matrix is significantly small, the corresponding coefficient in the matrix tends to zero. When $\alpha$ and $\beta$ tend to zero, the [T] matrix tends to equal [M] (an ideal DCT).

Losses Due to Voltage Ripple and Efficiency Considerations

The topologies presented here are loss free (in principle, assuming ideal capacitors and switching elements) as frequency tends to infinity. In practice the switching process involves losses, which is dependent on frequency. At low frequency range this dependence is to the inverse of the frequency (see: references [11] and [22]):

$$\Delta v = \frac{i_{out}}{2C_T \cdot f} \quad (38)$$

where $C_T$ is the equivalent capacitance measured from the output and f is the switching frequency. The denominator is multiplied by two due to the fact that the topology is implemented by dual circuits, as mentioned in (see: reference [14]). This voltage ripple implies losses due to the imbalance of capacitors voltage and the voltage source which empower the circuit. From (38) it is clear that the voltage ripple is reduced as frequency increases. This means that the frequency dependence is minor in higher frequencies as mentioned in (see: reference [22]). Conduction losses are dominant in higher frequencies. These losses are due to the On resistance of the switches and parasitic resistance of the capacitors. Increasing further the switching frequency, results in increased influence of losses which are linearly proportional to the frequency, due to the charge/discharge processes in the semiconductor junctions (see: reference It would be reasonable to operate the converter at a Mid-range frequency, in which the ripple is negligible and the high frequency losses impact is still small, so our loss calculation would be focused on this range.

In this case the dominant losses mechanism is the switches resistances and as first approximation only, this effect is considered.

In FIG. 13a GTSP with arbitrary voltage is considered. In this topology the switches and capacitor parasitic resistance are combined and are denoted as $\delta R$. Note that FIG. 13a describes the charging state and FIG. 13b is the discharging state of the configuration as shown.

Figure 13:
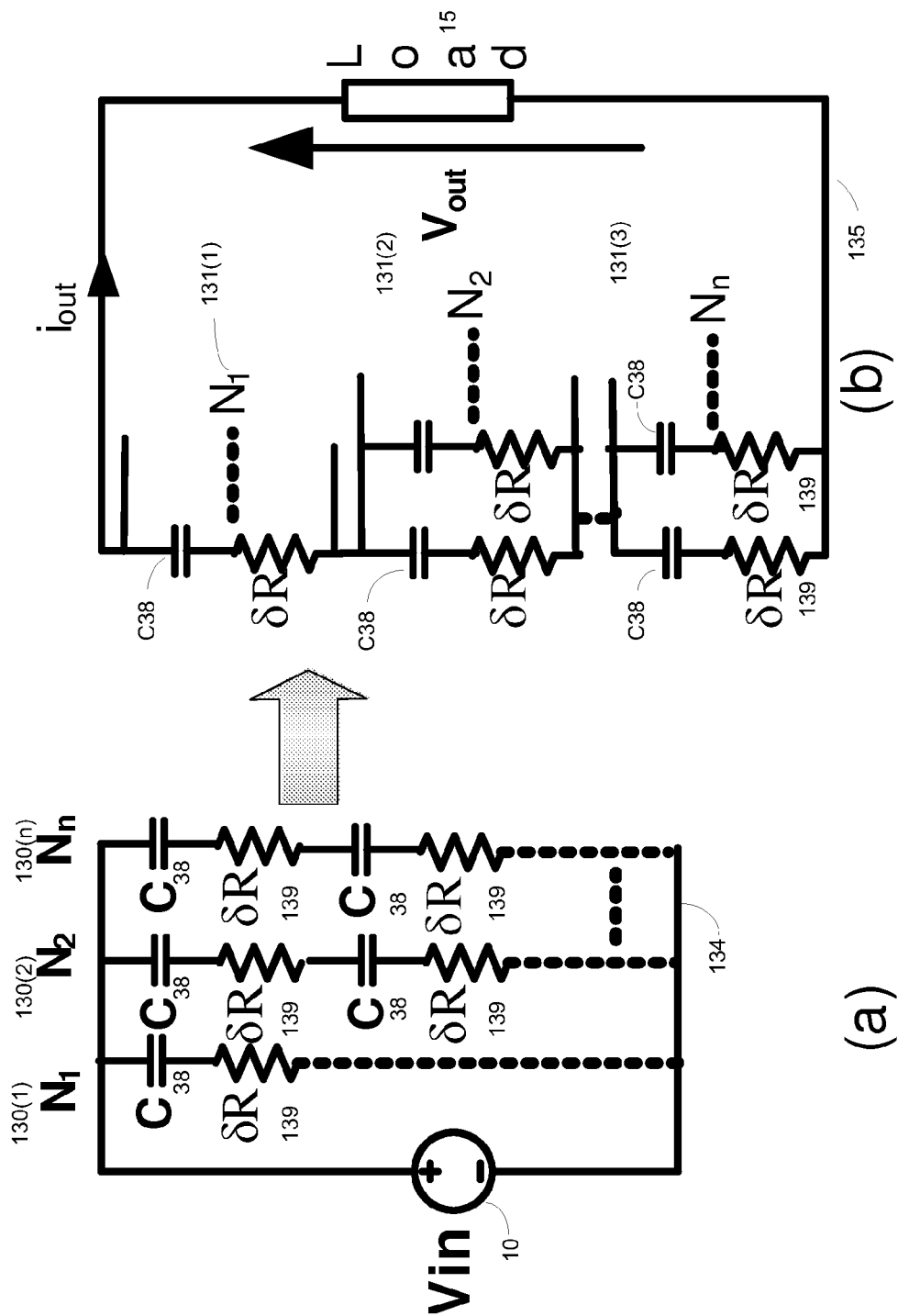

The left side of FIG. 13 (denoted (a)) illustrates a charging configuration 134 in which three branches 130(1)-130(3) are connected in parallel to the supply voltage 10. The numbers of the serially connected capacitors (and switches and capacitor parasitic resistances $\delta R$) of these branches are N1, N2 and N3.

The right side of FIG. 13 (denoted (b)) illustrates a discharging configuration 135 in which three elements 131(1)-131(3) are connected in a serial manner to the load 15. The numbers of the parallel connected capacitors and switches and capacitor parasitic resistances $\delta R$ of these branches are N1, N2 and N3.

The power loss in the parasitic resistances at the discharging state is:

$$\Delta P = N_1 \cdot \left[\left(\frac{i_{out}}{N_1}\right)^2 \delta R\right] + N_2 \cdot \left[\left(\frac{i_{out}}{N_2}\right)^2 \delta R\right] + \ldots + N_n \cdot \left[\left(\frac{i_{out}}{N_n}\right)^2 \delta R\right] = \quad (39)$$

$$\sum_{i=1}^{n} \frac{1}{N_i} (i_{out})^2 \delta R$$

It is interesting to mention that the Sigma section in the result of (39) is the DC/DC voltage ratio of the GTSP configuration as denoted by (7). Therefore, (39) can be written as:

$$\Delta P = M(i_{out})^2 \delta R \quad (40)$$

Figure 14:
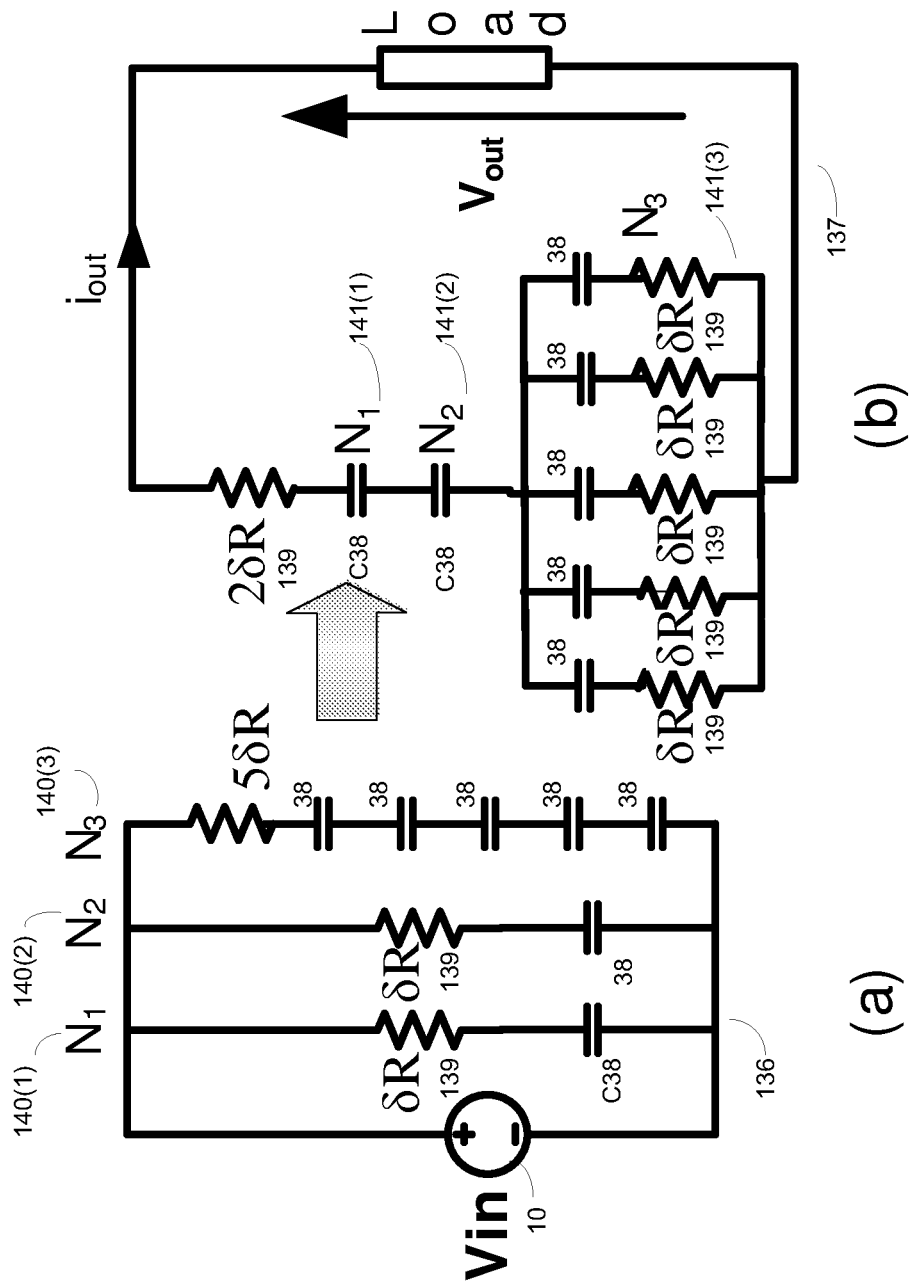

In FIG. 14 the GTSP with voltage ratio of 2.2 is reconsidered as an example. Note that in the charging state 136 (left side of FIG. 14), the resistance in the integer multiplication branches is $\delta R$ and in the $N_3$ branch of the fractional multiplication, the resistance is the net resistance of all five capacitors. Therefore the resistance in this branch equals to $5\delta R$. In the discharging state 137 (right side of FIG. 14), the upper resistance is the net resistance of the $N_1$ and $N_2$ resistances, namely, $2\delta R$. Each of the paralleled five capacitor of $N_3$ row has a series resistance of $\delta R$, as shown.

In the charging configuration 136 three branches 140(1)-140(3) are connected in parallel to the supply voltage 10. The numbers of the serially connected capacitors (and switches and capacitor parasitic resistances $\delta R$) of these branches are N1=1, N2=2 and N3=5.

In the discharging configuration 137 three elements 141(1)-141(3) are connected in a serial manner to the load 15. The numbers of the parallel connected capacitors and switches and capacitor parasitic resistances $\delta R$ of these branches are N1=1, N2=1 and N3=5.

The power loss in the parasitic resistances at the discharging state is:

$$\Delta P = 5 \cdot \left[\left(\frac{i_{out}}{5}\right)^2 \delta R\right] + i_{out}^2 \cdot 2\delta R = \quad (41)$$

$$= i_{out}^2 \left(\frac{55}{25}\right) \delta R = 2.2 i_{out}^2 \delta R$$

As expected from (40) the constant 2.2 is the DC/DC voltage ratio of the converter. It can be shown that this result is valid for any GTSP topology. The power loss in the switches is a function of the voltage transfer ratio, the On resistance of the switches and the load resistance as in (40).

Subsequently, the ratio between the power losses on the parasitic and switches resistors and the output power (assuming constant power on the load) can be written as:

$$\frac{\Delta P}{P_{load}} = \frac{i_{out}^2 M \delta R}{P_{load}} = M\left(\frac{\delta R}{R_{Load}}\right) \quad (42)$$

and the efficiency is therefore:

$$\eta = 1 - \frac{\Delta P}{P_{load}} \quad (43)$$

In a practical case, the converter is applied for power processing. If constant output power is considered, (42) yields that for increasing of the voltage transfer ratio M, the square of the output current is decreased. Thus, in total the losses are decreasing linearly with the increase in M.

Equation (42) indicates that the conduction losses are a function of the transfer ratio M, the load resistance and the parasitic resistance δR only. Therefore, for simple conventional ratio (such as 1.5), in which 3 capacitors is required and for more complex transfer ratio (such as 1.35), in which a larger number of capacitors are required, the variations in power losses would be very modest.

It should be noted that this analysis does not consider housekeeping losses and second order phenomena that can lower the efficiency.

GTSP vs. Matrix Topology

Matrix topology is based on rectangular matrices of equally valued capacitors as mentioned above. In Matrix topology the voltages and currents are equally divided between the capacitors. Thus, this topology has improved usage of the converters volume. However, this advantage comes complexity in the number of switches and the control scheme. This topology has the disadvantage of being implemented by a large number of capacitors at non conventional DC/DC voltage ratios (such as 2.2). At the same voltage ratios the GTSP topology can be realized by a considerably reduced number of capacitors. This is an advantage when integration and losses are considered, since the reduction of capacitors yields a reduction of the number of switches proportionally. Therefore, the converter can be implemented on a smaller space and switching losses are reduced.

The unequal voltages and currents on the capacitors at GTSP topology have an effect on the design. This is due to the fact that the equally valued capacitors should be designed, consequently that each capacitor is capable of holding the highest stress.

Simulation Results

As a simulation example, the 2.2 and 2.25 DC/DC voltage ratio circuit were tested. The number of capacitors in these GTSP configurations is 7 for 2.2 ratio and 6 for 2.25 voltage ratio, as shown in FIG. 8b.

Figure 15:
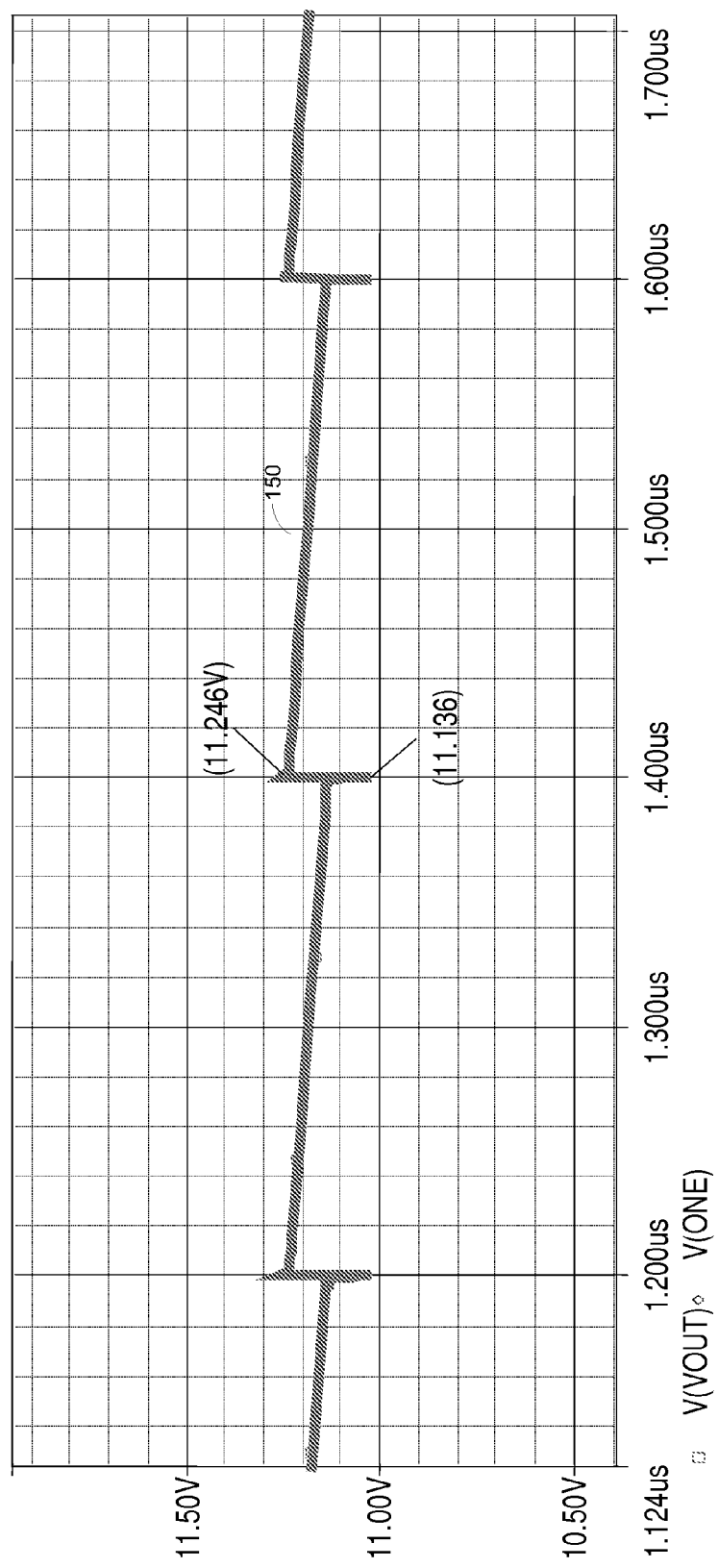
Figure 16:
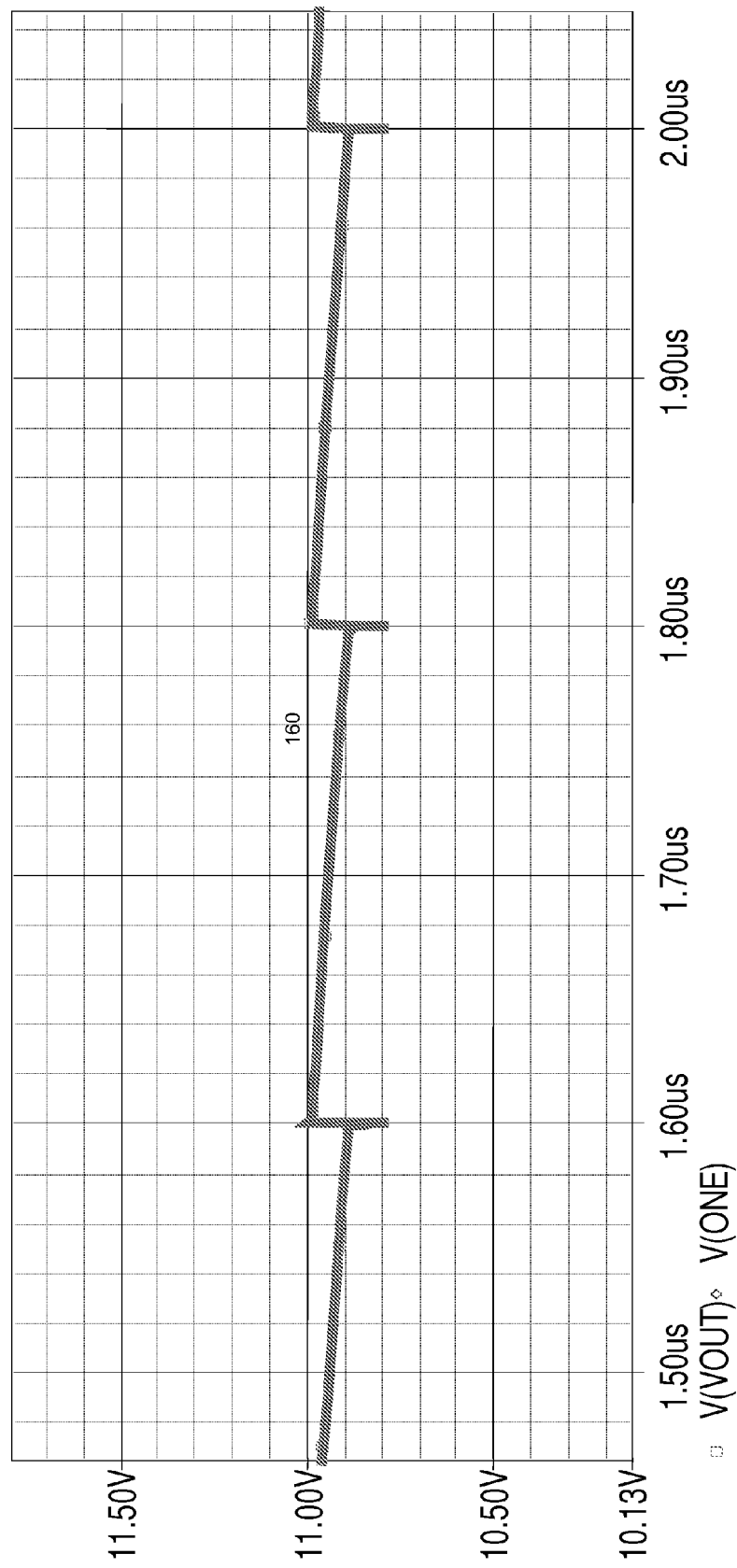

The 2.2 DC/DC voltage ratio is achieved by connecting one capacitor in $N_1$ and $N_2$ columns. This section is the rough integer multiplication of 2. The last column $N_3$, consists of 5 capacitors for fine tuning of 0.25 multiplication and 4 capacitors for 0.2 multiplication. The simulation results are shown in FIG. 15 (curve 150) and FIG. 16 (curve 160).

The simulation was performed with dual circuits that work in complementary phases for the elimination of large external capacitors (see: reference [14]). The input voltage is 5V with capacitors of 50 pF. The simulation results show the assumed 11.25 for 2.25 voltage ratio and the 10.95V for 2.2 voltage ratio are obtained. Next the output voltage ripple is simulated for various frequencies; the results are shown in FIG. 17.

Figure 17:
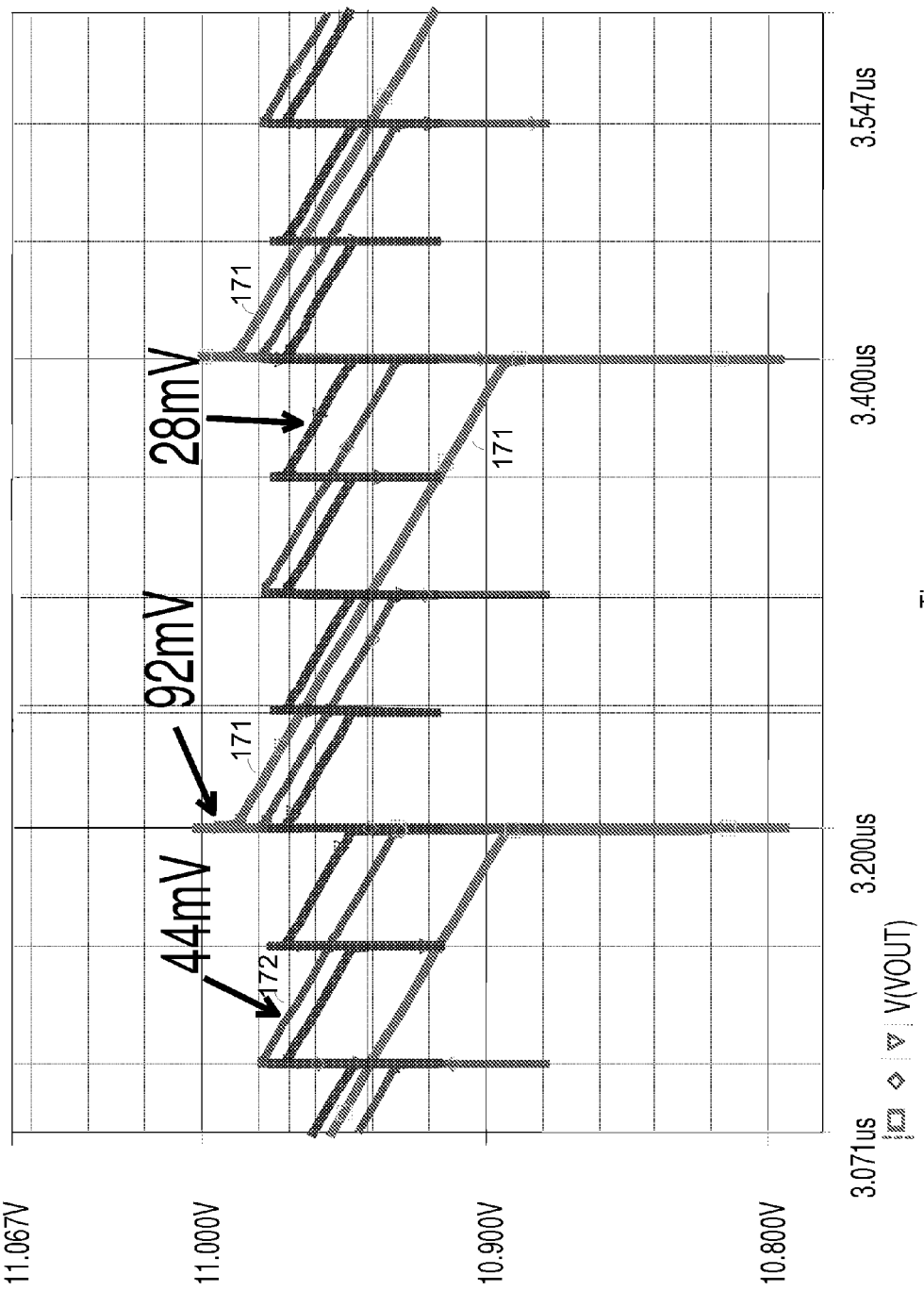

In FIG. 17 the GTSP topology is constant (a 2.2 voltage ratio) the capacitors and load are also constant. The changing variable is the circuit frequency. The results show that for 2.5 MHz (curve 171) the voltage ripple is 92 mV when the calculated ripple by (38) is 99 mV on a 1 k load. At 5 MHz (curve 172) the simulation shows 44 mV and at 10 MHz (curve 173), 28 mV when the calculated ripples are 49 mV and 25 mV respectively.

Figure 18:
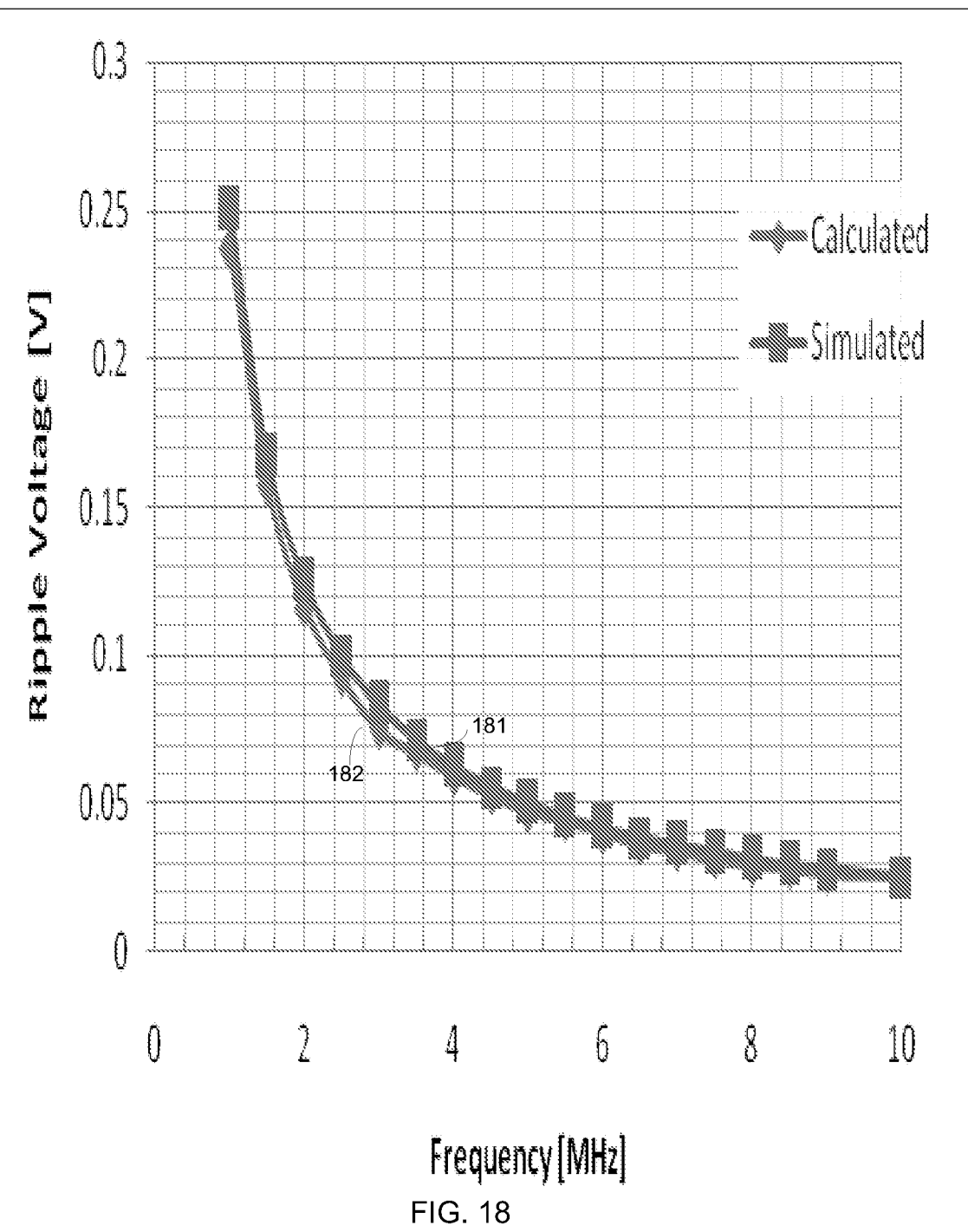

Comparison of the simulated results (curve 181) to the calculated (curve 182) results of (38) for a 2.2 voltage ratio configuration, yield the graphs in FIG. 18. The results are shown for frequency range of 1 MHz to 10 MHz and show good agreement with the theory.

Figure 19:
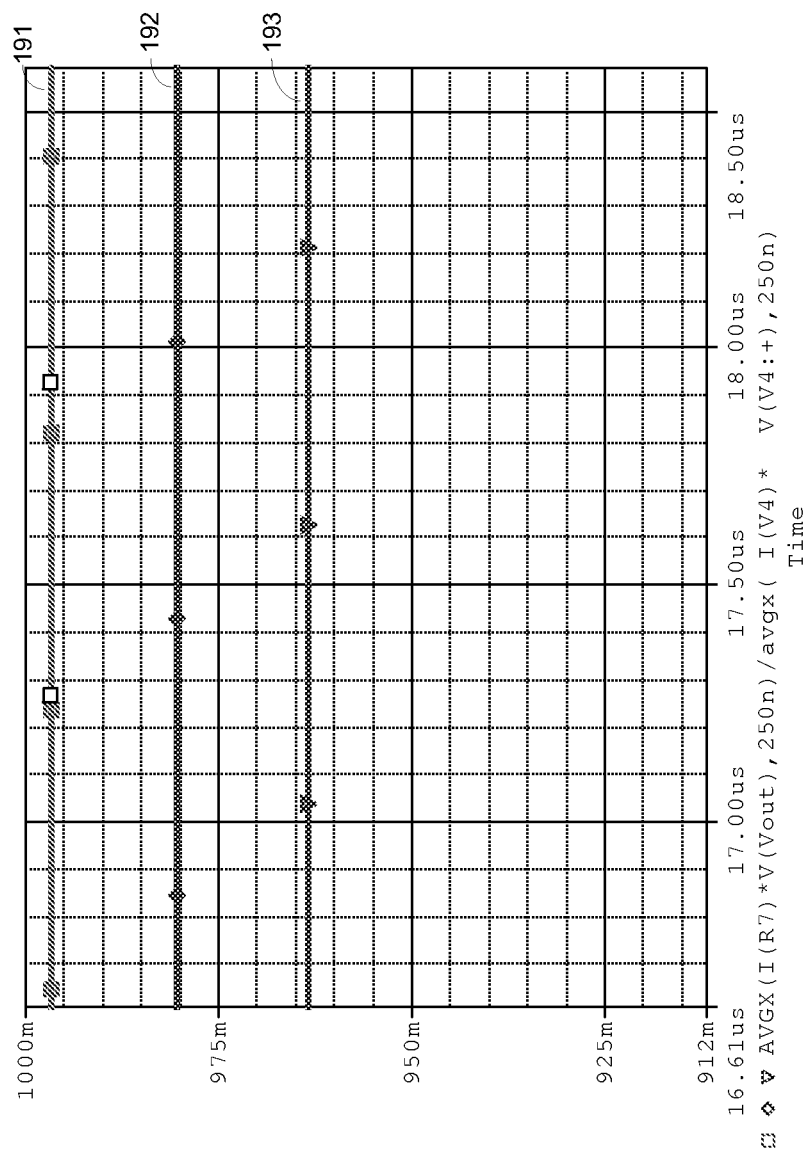

In FIG. 19 the efficiency is calculated for a 2.2 DC/DC voltage ratio with on resistance of 10 mΩ (curve 191), 100 mΩ (curve 192) and 500 mΩ (curve 193) for the switches.

The results are consistent with equations (42) and (43) and show efficiencies over 95%. These results are only a first approximation since other losses mechanisms can lower the efficiency as mentioned above.

FIGS. 20, 21 and 24-26 illustrate various configurations of a circuit 200 that includes three capacitors C1-C3 211-213 and 20 switches 201-210.

The first end of voltage supply 10 is connected to a first end of switch D 201. The other end of switch D 201 is connected to a first end of capacitor C1 211, a first end of switch a1 203 and a first end of switch D' 202. The second end of voltage supply 201, capacitor C3 13, switch b1 210 and load 15 are connected to each other. The second end of switch 21 203 is connected to a first end of switch 1A 206 and switch 4A 209. The second end of C1 211 is connected to a first end of switch 3A 205 and a first end of switch 2A 204. The second end of switch 2A 204 is connected to a second end of switch 1A 206 and a first end of capacitor C2 212. The second end of C2 212 is connected to a first end of switch 6A 207 and a first end of switch 5A 208. The second end of switch 5A 208 is connected to a second end of switch 4A 209 and a first end of capacitor C3 213.

Figure 22:
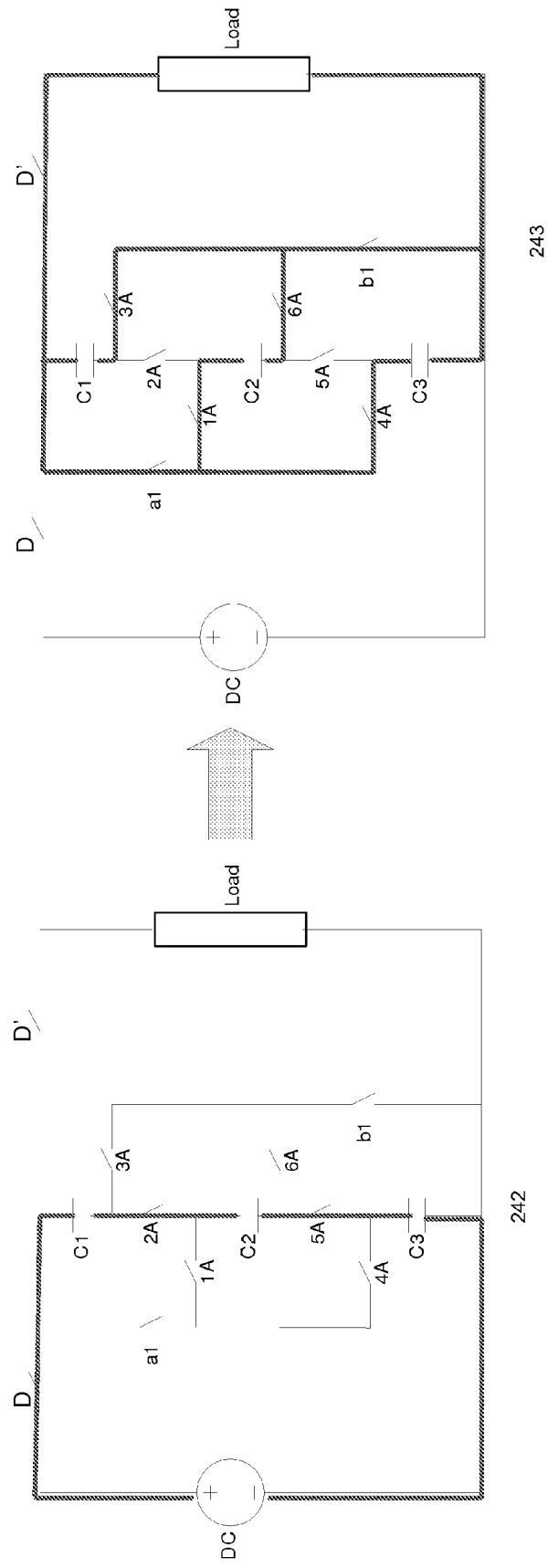
Figure 23:
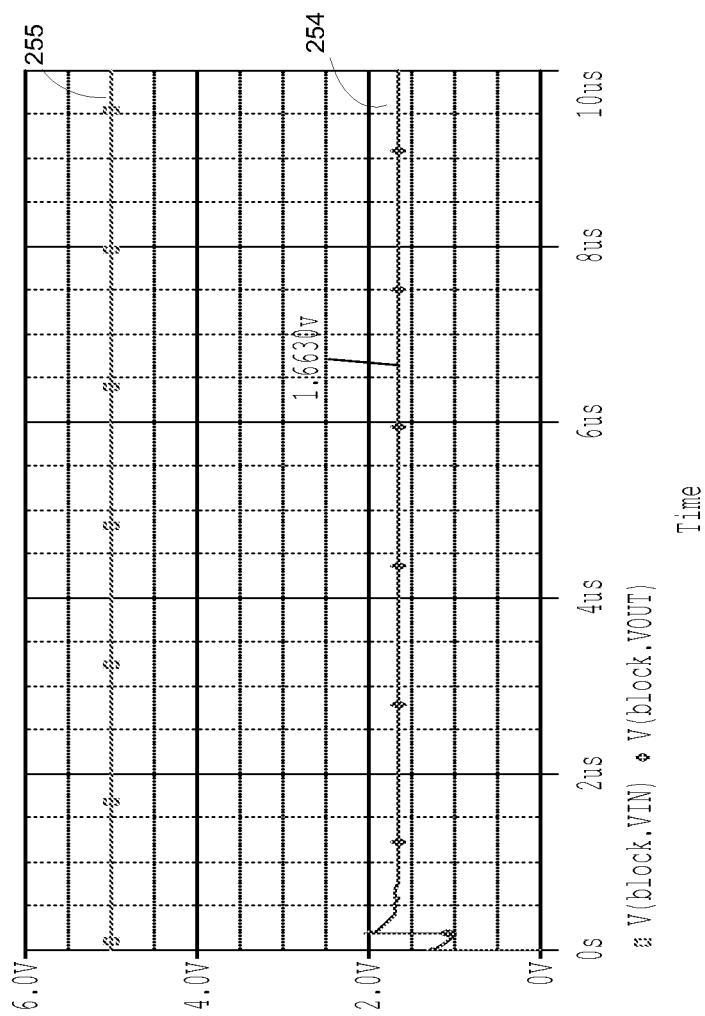

In FIG. 22 a charge configuration 242 (switches D 201, 2A 204 and 5A 208 are closed) and a discharge configuration 243 (switches D' 202, a1 203, 1A 206, 4A 209, 3A 205, 6A 207 and b1 210 are closed) that provide a ratio of 1/3 are shown.

FIG. 3 illustrates the relationship between the input voltage (curve 255) and the output voltage (curve 254).

Figure 24:
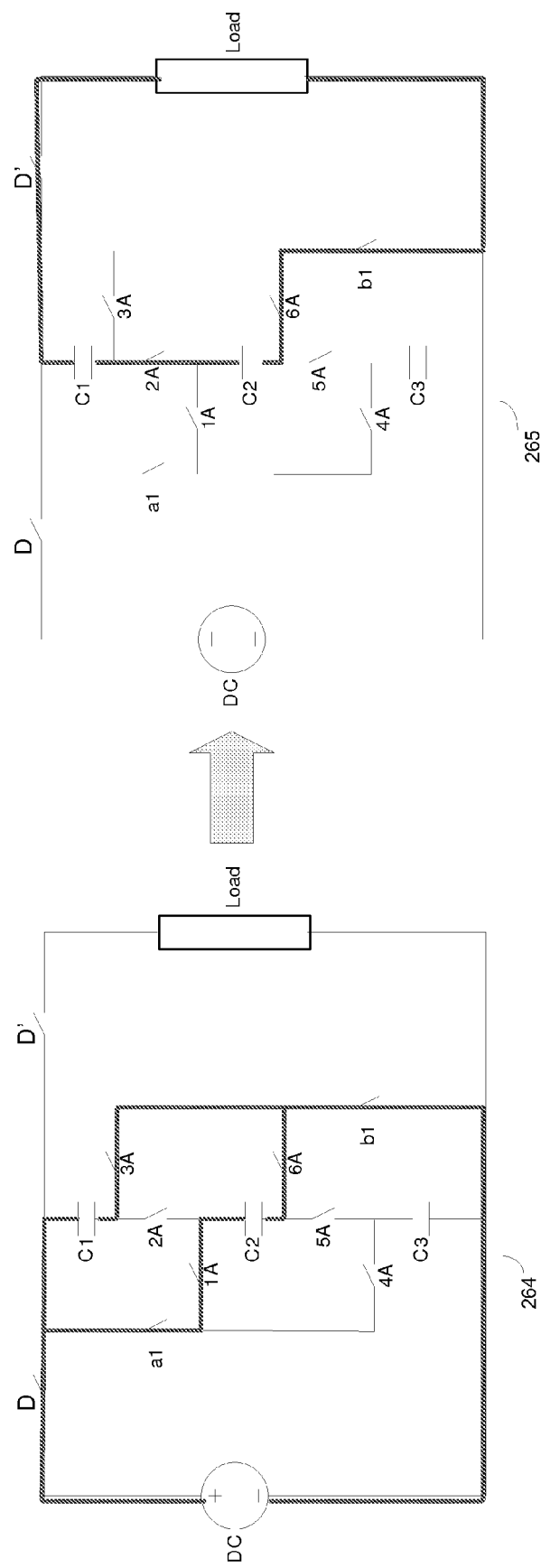

In FIG. 24 a charge configuration 264 (switches D 201, 1A 206, a1 203, 6A 207 and 3A 205 are closed) and a discharge configuration 265 (switches D' 202, 2A 204, 6A 207 and b1 210 are closed) that provide a ratio of 1/2 are shown.

Figure 25:
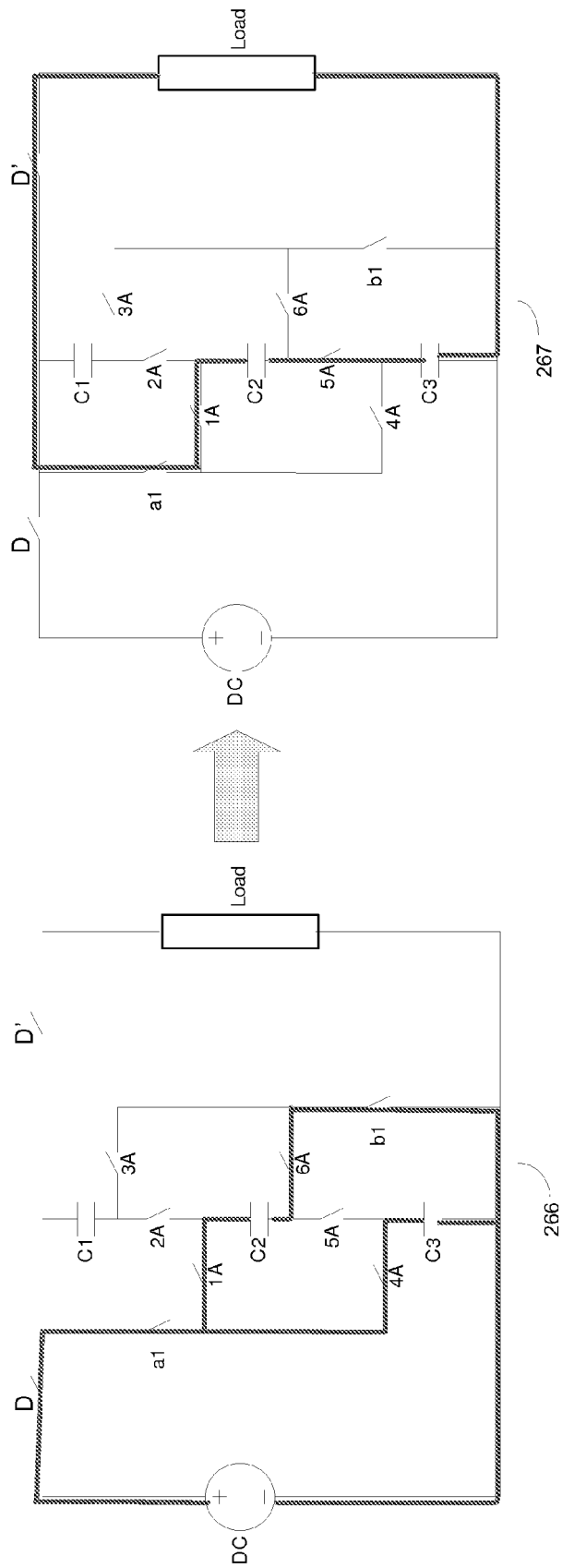

In FIG. 25 a charge configuration 266 (switches D 201, a1 203, 1A 206, 6A 207, b1 210 and 4A 209 are closed) and a discharge configuration 267 (switches D' 202, a1 203, 1A 206 and 5A 208 are closed) that provide a ratio of 1/2 are shown.

Figure 26:
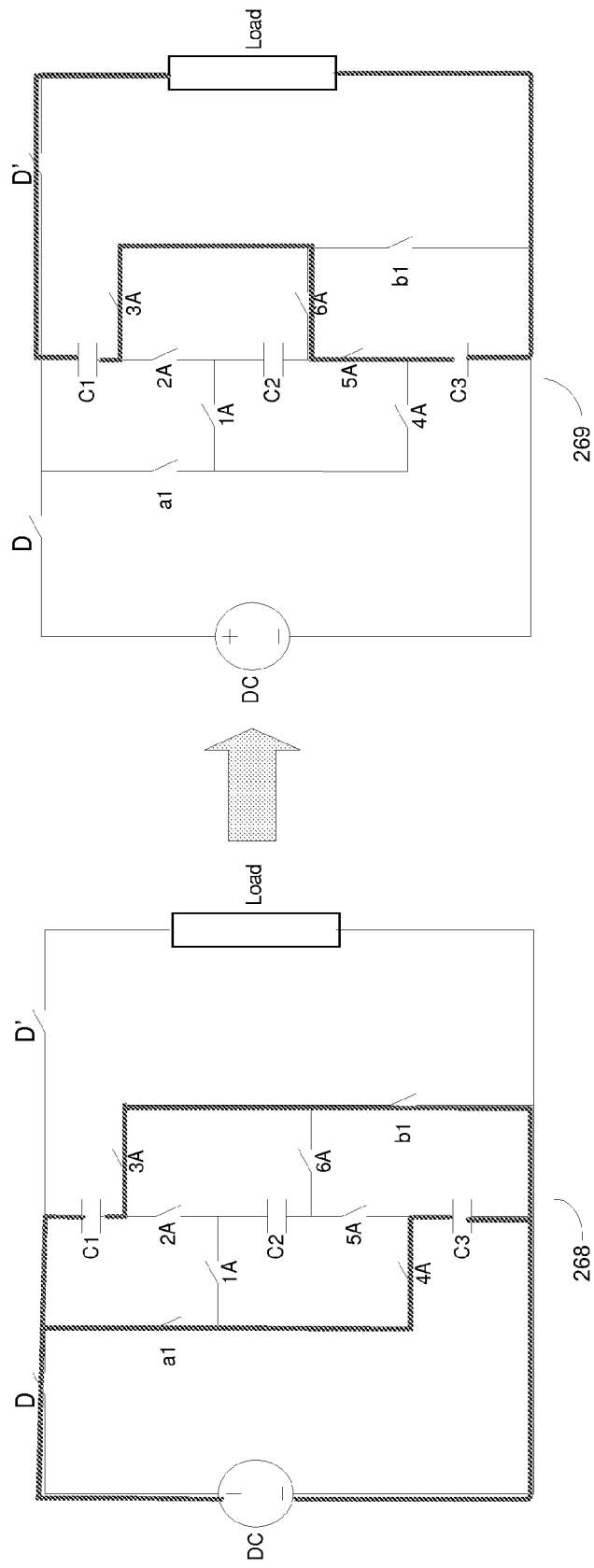

In FIG. 26 a charge configuration 268 (switches D 201, a1 203, 4A 209, 3A 205 and b1 210 are closed) and a discharge configuration 269 (switches D' 202, 3A 205, 6A 207 and 5A 208 are closed) that provide a ratio of 1/2 are shown.

Figure 20:
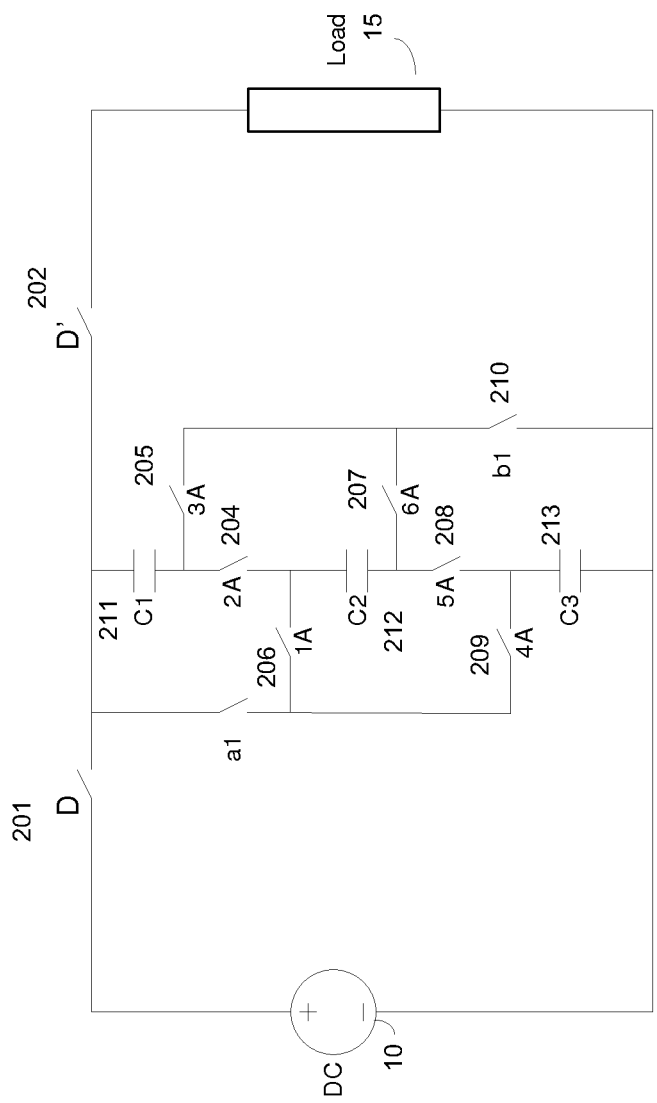
Figure 21:
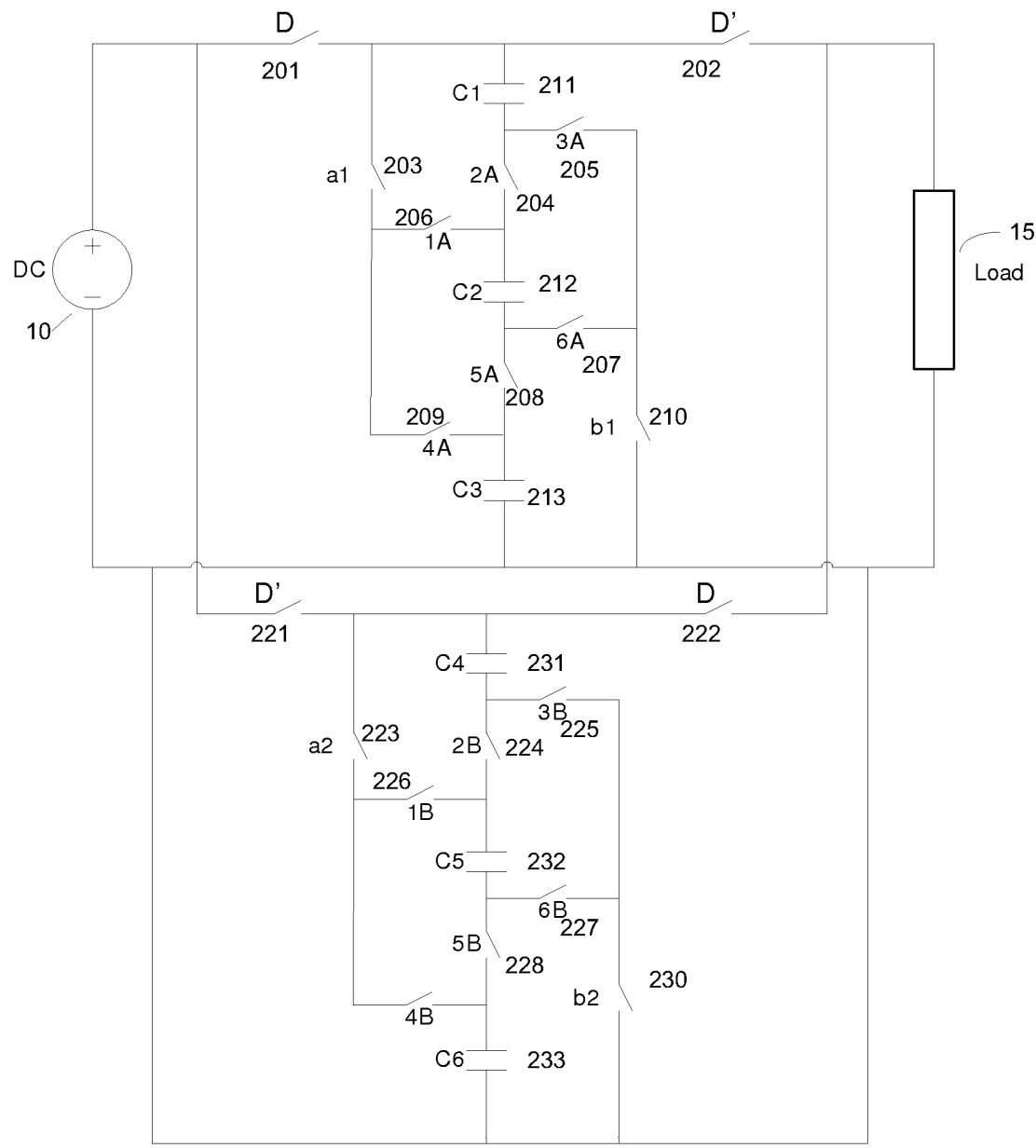

FIG. 21 illustrates a circuit 210 that has another set of three capacitors 231, 232 and 233 and ten switches 221-230 that are coupled in parallel to the three capacitors 211-213 and the ten switches 201-210 illustrated in FIG. 20. The three capacitors 231, 232 and 233 and ten switches 221-230 that are to each other at the same manner in which three capacitors 211-213 and the ten switches 201-210 are coupled to each other.

Figure 27:
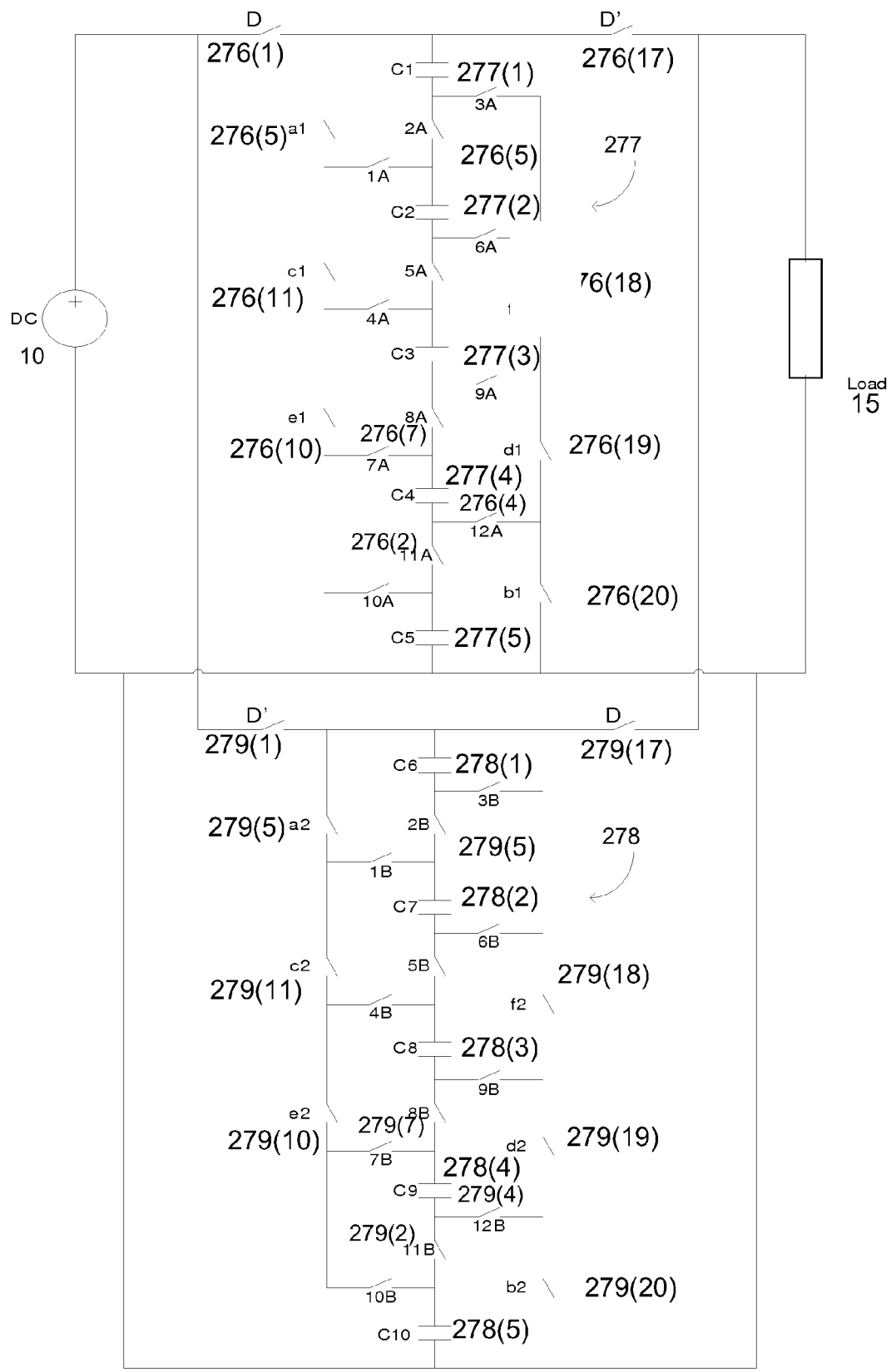

FIG. 27 illustrates two matrixes 277 and 278 that are connected in parallel between load 15 and voltage supply 10. First matrix 277 includes 4 capacitors 277(1)-277(4) and 20 switches 276(1)-276(20). Second matrix 278 includes 4 capacitors 278(1)-278(4) and 20 switches 279(1)-279(20).

The connection between the voltage ripple ΔV and output voltage Vout, the frequency f, load resistance Rload and capacitance C equals:

$$\frac{\Delta V}{V_{out}} = \frac{1}{2 \cdot 1/N \cdot C \cdot f \cdot R_{Load}}$$

Figure 28:
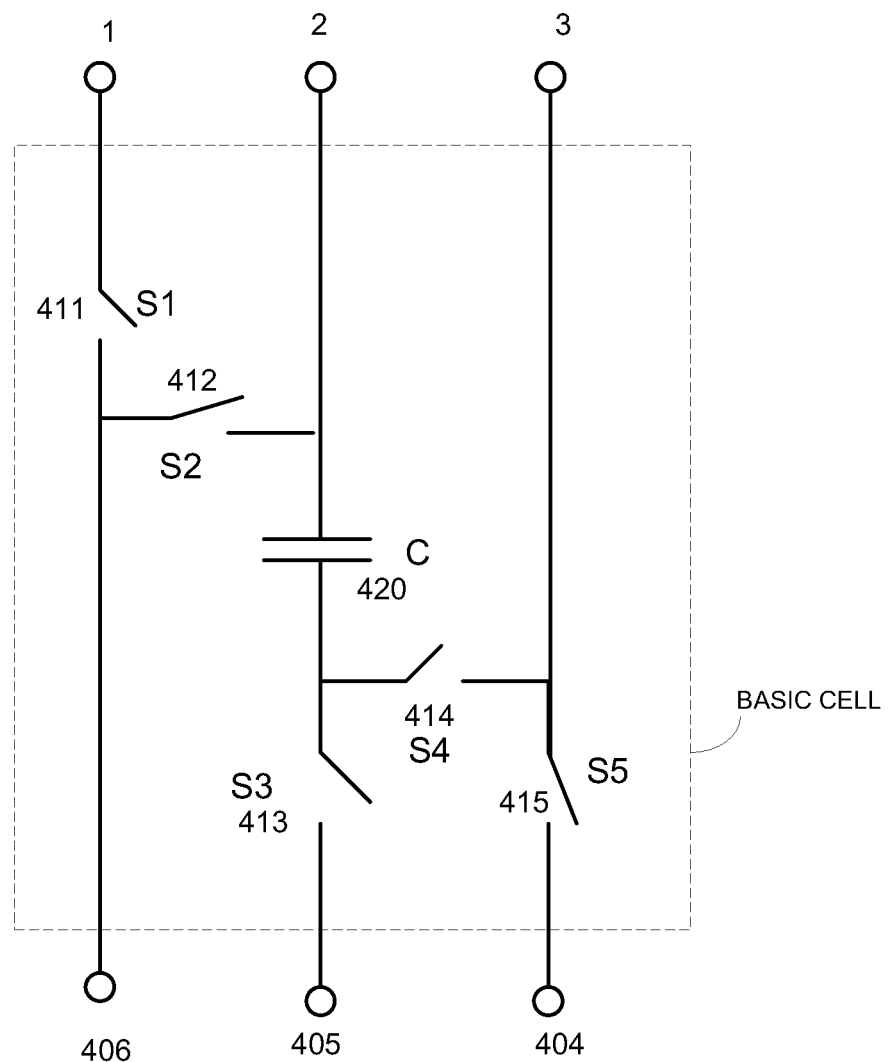
FIGS. 28-31 illustrate a modular cell and its environment according to various embodiments of the invention.

A DC to DC converter may include multiple modular cells such as the modular cell 400 of FIG. 28.

The modular cell 400 includes: a first switch s1 411, coupled between a first port 401 and a sixth port 406; a second switch s2 412, coupled between the sixth port 406 and a second port 402; a capacitor 420, coupled between the second port 402 and a third switch s3 413; said third switch s3 413 is coupled between the capacitor 420 and a fifth port 405; a fourth switch s4 414 coupled between the capacitor 420 and a third port 403; and a fifth switch s5 415 coupled between the third port 403 and a fourth port 404.

Figure 29:
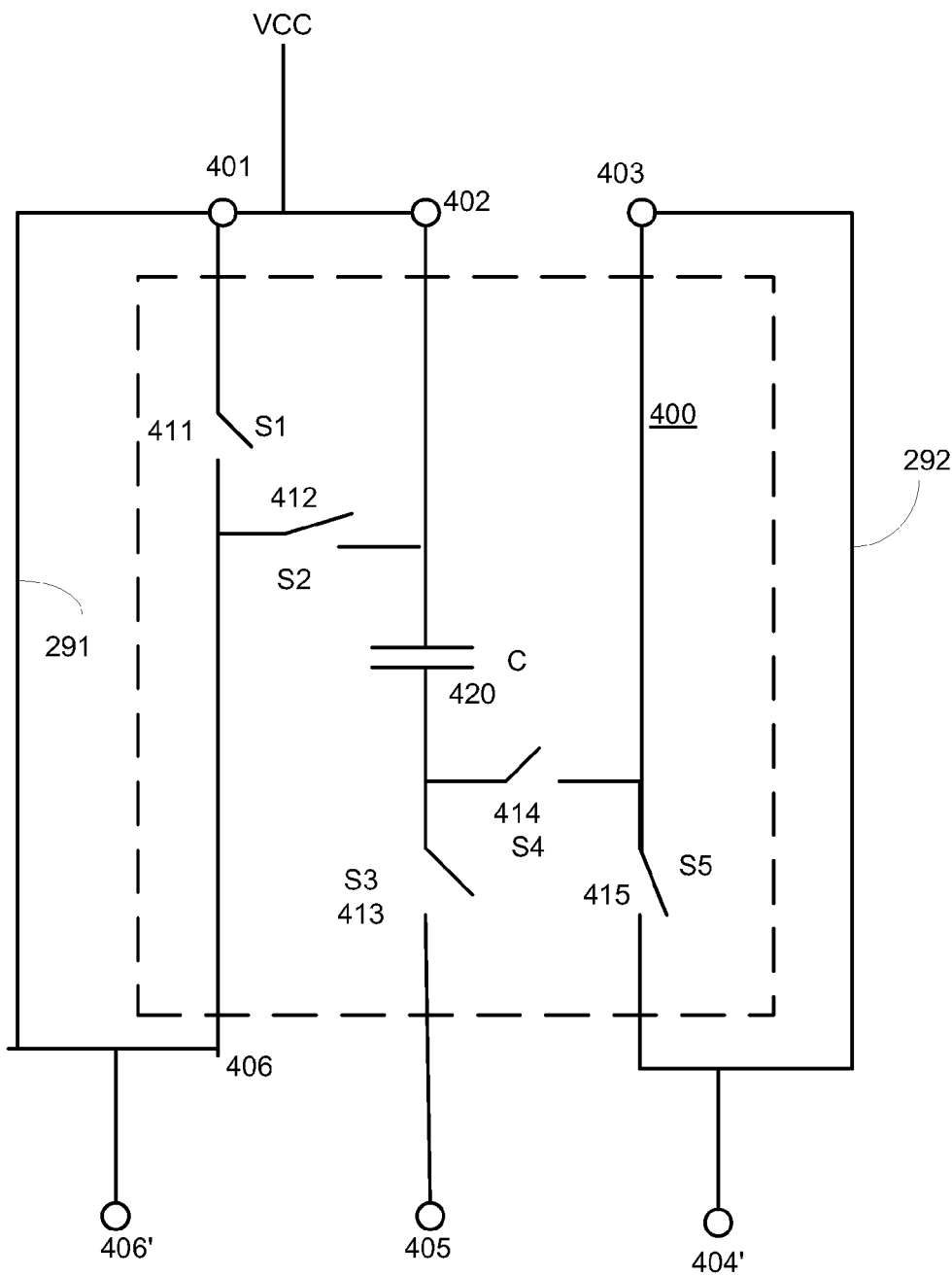

FIG. 29 illustrates a circuit 429 that includes a modular cell 400 that is connected (charged) to a supply voltage (Vcc) whereas conductor 291 shorts ports 401 and 406, and conductor 292 shorts ports 404 and 403. The output ports of circuit 429 are denoted 406' (connected to port 406), 404' (connected to port 404) and 405.

Figure 30:
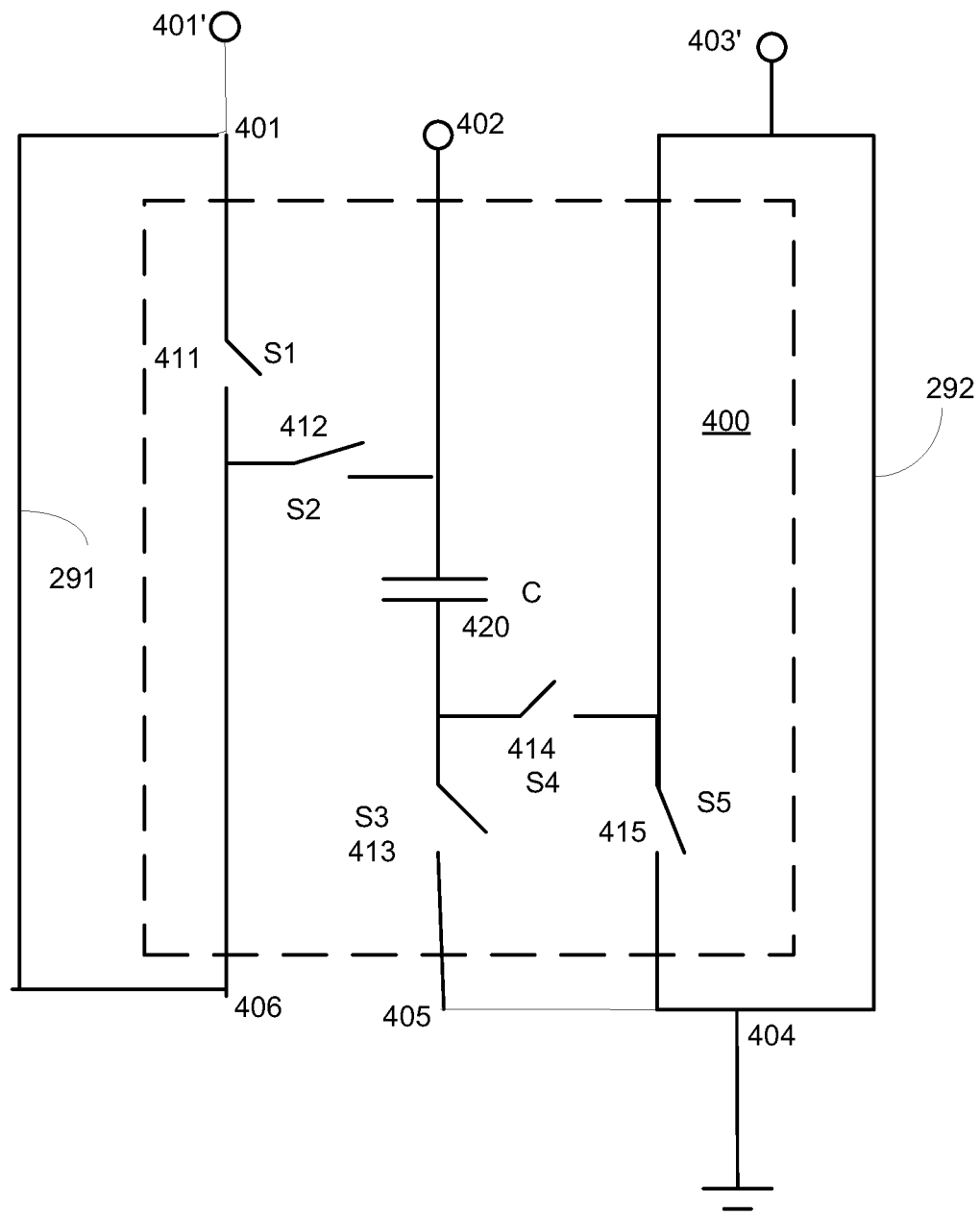

FIG. 30 illustrates a circuit 430 that includes a modular cell 400 that is connected (charged) to the ground (Vcc) whereas conductor 291 shorts ports 401 and 406, and conductor 292 shorts ports 405, 404 and 403. The output ports of circuit 430 are denoted 401' (connected to port 401), 403' (connected to port 403) and 402.

Figure 31:
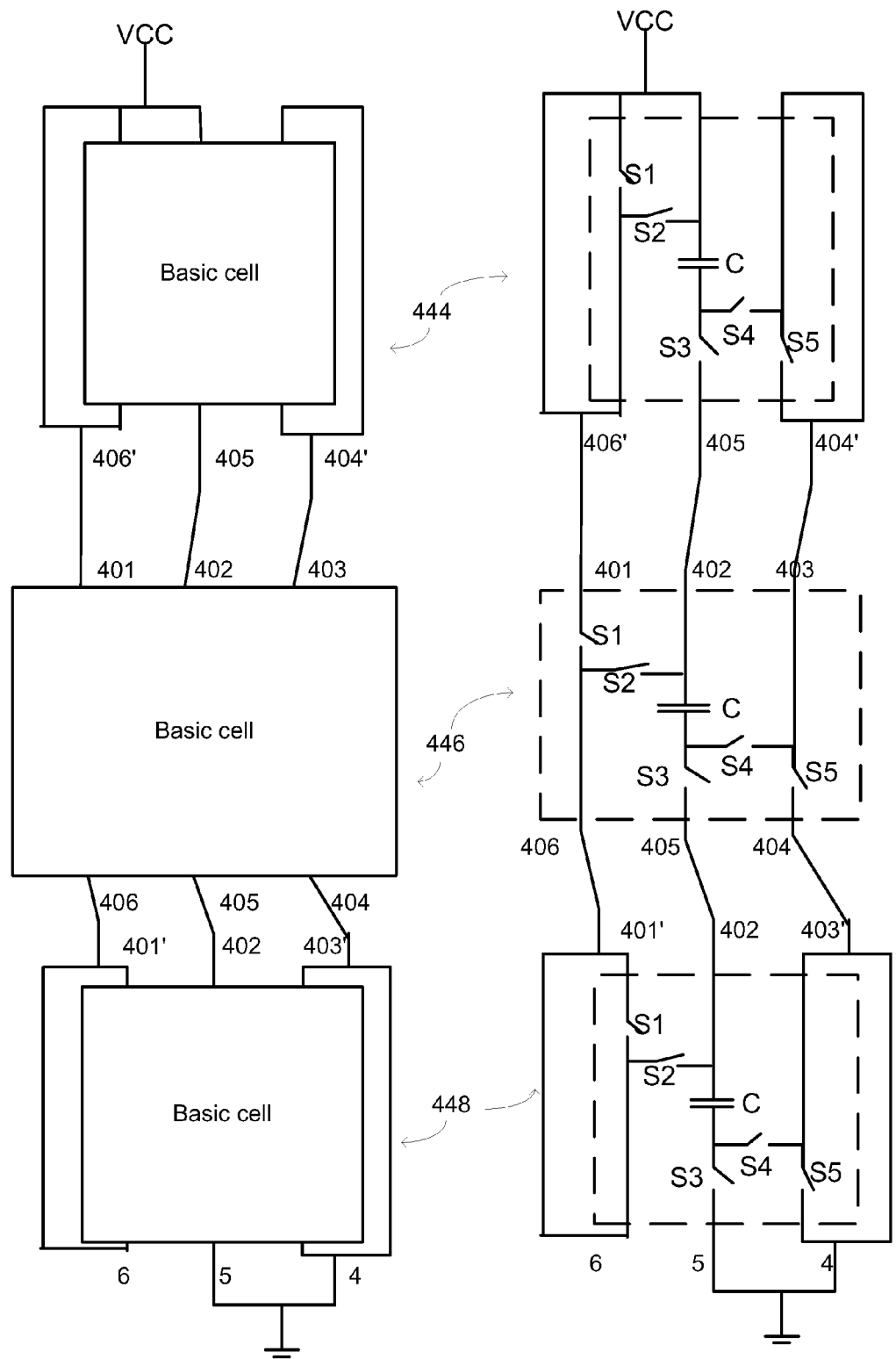

FIG. 31 illustrates three circuit 444, 446 and 448. The first circuit 444 equals circuit 429 of FIG. 9. The second circuit 448 equals circuit 430 of FIG. 30. A modular cell 446 is connected between circuits 444 and 448—(i) ports 401-403 of modular cell 446 are connected to ports 306', 405 and 404' of first circuit 444, and (ii) ports 404-406 of modular cell 446 are connected to ports 403', 402 and 401' of third circuit 448.

Figure 32:
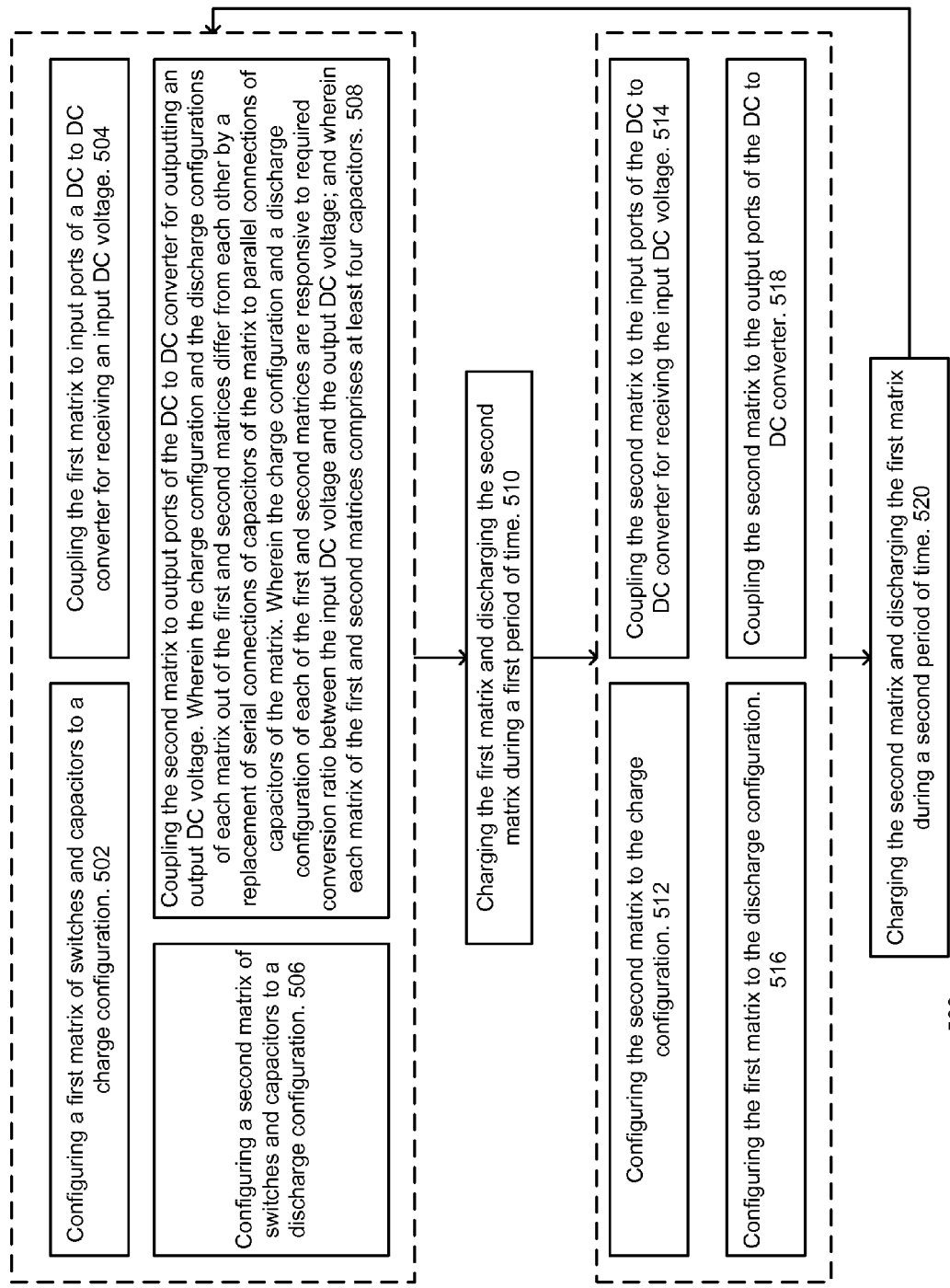
FIG. 32 illustrates a method according to an embodiment of the invention.

FIG. 32 illustrates a method 500 according to an embodiment of an invention.

Method 500 starts by stage 502 of configuring a first matrix of switches and capacitors to a charge configuration, stage 504 of coupling the first matrix to input ports of a DC to DC converter for receiving an input DC voltage, stage 506 of configuring a second matrix of switches and capacitors to a discharge configuration, stage 508 of coupling the second matrix to output ports of the DC to DC converter for outputting an output DC voltage. Wherein the charge configuration and the discharge configurations of each matrix out of the first and second matrices differ from each other by a replacement of serial connections of capacitors of the matrix to parallel connections of capacitors of the matrix. Wherein the charge configuration and a discharge configuration of each of the first and second matrices are responsive to required conversion ratio between the input DC voltage and the output DC voltage; and wherein each matrix of the first and second matrices comprises at least four capacitors.

Stages 502, 504, 506 and 508 are followed by stage 510 of charging the first matrix and discharging the second matrix during a first period of time.

Stage 510 is followed by stage 512 of configuring the second matrix to the charge configuration, stage 514 of coupling the second matrix to the input ports of the DC to DC converter for receiving the input DC voltage; stage 516 of configuring the first matrix to the discharge configuration; and stage 518 of coupling the second matrix to the output ports of the DC to DC converter.

Stages 512, 514, 516 and 518 are followed by stage 520 of charging the second matrix and discharging the first matrix during a second period of time.

Those of skill in the art will appreciate that various equivalents can be provided without departing from the spirit of the invention.

We claim:

1. A direct current (DC) to DC converter, comprising: input ports for receiving an input DC voltage; output ports for outputting an output DC voltage; a first matrix of capacitors and switches; and a control circuit, coupled to the switches of the first matrix, configured to repetitively:
configure the first matrix to a charge configuration and couple the first matrix to the input ports;
maintain the charge configuration for a first period of time;
configure the first matrix to the discharge configuration and couple the first matrix to the output ports; and
maintain the discharge configurations for a second period of time;
wherein the charge configuration and the discharge configurations of the first matrix differ from each other by a replacement of serial connections of capacitors of the matrix to parallel connections of capacitors of the matrix;
wherein the charge configuration and a discharge configuration the first matrix are responsive to required conversion ratio between the input DC voltage and the output DC voltage;
wherein different required conversion ratios result in different charge and discharge configurations; and
wherein the first matrix comprises at least four capacitors; and
wherein the first matrix comprises a modular cell, wherein the modular cell comprises a first switch, coupled between a first port and a sixth port; a second switch, coupled between the sixth port and a second port; a capacitor, coupled between the second port and a third switch; said third switch is coupled between the capacitor and a fifth port; a fourth switch coupled between the capacitor and a third port; and a fifth switch coupled between the third port and a fourth port.

2. The DC to DC converter according to claim 1 wherein the first matrix comprises multiple modular cells.

3. The DC to DC converter according to claim 1 wherein the first matrix is a non-rectangular matrix.

4. A direct current (DC) to DC converter, comprising: input ports for receiving an input DC voltage; output ports for outputting an output DC voltage; a first matrix of capacitors and switches; a second matrix of capacitors and switches; and a control circuit, coupled to the switches of the first matrix and to the switches of the second matrix, wherein the control unit is configured to repetitively:

configure the first matrix to the charge configuration and couple the first matrix to the input ports while configuring the second matrix to the discharge configuration and coupling the second matrix to the output ports;

maintain the charge and discharge configurations for the first period of time;

configure the second matrix to the charge configuration and couple the second matrix to the input ports while configuring the first matrix to the discharge configuration and couple the first matrix to the output ports; and maintain the charge and discharge configurations for the second period of time;

wherein the charge configuration and the discharge configurations of each one of the first matrix and the second matrix differ from each other by a replacement of serial connections of capacitors of the matrix to parallel connections of capacitors of the matrix;

wherein the charge configuration and the discharge configuration of each one of the first matrix and the second matrix are responsive to required conversion ratio between the input DC voltage and the output DC voltage;

wherein different required conversion ratios result in different charge and discharge configurations of each one of the first matrix and the second matrix;

wherein of each one of the first matrix and the second matrix comprises at least four capacitors; and wherein the first matrix comprises a modular cell, wherein the modular cell comprises a first switch, coupled between a first port and a sixth port; a second switch, coupled between the sixth port and a second port; a capacitor, coupled between the second port and a third switch; said third switch is coupled between the capacitor and a fifth port; a fourth switch coupled between the capacitor and a third port; and a fifth switch coupled between the third port and a fourth port.

5. The DC to DC converter according to claim 4 wherein the first matrix and the second matrix comprises multiple modular cells.

6. The DC to DC converter according to claim 4 wherein the second matrix is a non-rectangular matrix.

7. The DC to DC converter according to claim 4 wherein the control unit is configure d to repetitively configure the first matrix, maintain the charge and discharge configurations for the first period of time; configure the second matrix and maintain the charge and discharge configurations for the second period of time at a rate that exceeds 2 megahertz.

8. A method for direct current (DC) to DC conversion, the method comprises repeating the stages of:
   configuring a first matrix of capacitors and switches to a charge configuration;
   coupling the first matrix to input ports of a DC to DC converter;
   maintaining the charge configuration for a first period of time;
   configuring the first matrix to a discharge configuration;
   coupling the first matrix to output ports of the DC to DC converter;
   maintaining the discharge configurations for a second period of time;
   wherein the charge configuration and the discharge configurations of the first matrix differ from each other by a replacement of serial connections of capacitors of the matrix to parallel connections of capacitors of the matrix;
   wherein the charge configuration and a discharge configuration the first matrix are responsive to required conversion ratio between the input DC voltage and the output DC voltage;
   wherein different required conversion ratios result in different charge and discharge configurations;
   wherein the first matrix comprises at least four capacitors; and
   wherein the first matrix comprises a modular cell, wherein the modular cell comprises a first switch, coupled between a first port and a sixth port; a second switch, coupled between the sixth port and a second port; a capacitor, coupled between the second port and a third switch; said third switch is coupled between the capacitor and a fifth port; a fourth switch coupled between the capacitor and a third port; and a fifth switch coupled between the third port and a fourth port.

9. The method according to claim 8 wherein the first matrix comprises multiple modular cells.

10. The method according to claim 8 wherein the first matrix is a non-rectangular matrix.

11. A method for direct current (DC) to DC conversion, the method comprises repeating the steps of:
   configuring a second matrix of switches and capacitors to a discharge configuration and coupling the second matrix to output ports of a DC to DC converter while configuring a first matrix of switches and capacitors to a charge configuration and coupling the first matrix to input ports of the DC to DC converter;
   maintaining the charge and discharge configurations for the first period of time;
   configuring the second matrix to a charge configuration and coupling the second matrix to the input ports of the DC to DC converter while configuring the first matrix to a discharge configuration and coupling the first matrix to the output ports; and
   maintaining the charge and discharge configurations for the second period of time;
   wherein the charge configuration and the discharge configurations of each one of the first matrix and the second matrix differ from each other by a replacement of serial connections of capacitors of the matrix to parallel connections of capacitors of the matrix;
   wherein the charge configuration and the discharge configuration of each one of the first matrix and the second matrix are responsive to required conversion ratio between the input DC voltage and the output DC voltage;
   wherein different required conversion ratios result in different charge and discharge configurations each one of the first matrix and the second matrix; and wherein each one of the first matrix and the second matrix comprises at least four capacitors; wherein the first matrix and the second matrix comprise a modular cell, wherein the modular cell comprises a first switch, coupled between a first port and a sixth port; a second switch, coupled between the sixth port and a second port; a capacitor, coupled between the second port and a third switch; said third switch is coupled between the capacitor and a fifth port; a fourth switch coupled between the capacitor and a third port; and a fifth switch coupled between the third port and a fourth port.

12. The method according to claim 11 wherein the first matrix and the second matrix comprises multiple modular cells.

13. The method according to claim 11 wherein the second matrix is a non-rectangular matrix.

14. The method according to claim 11 comprising repetitively configuring the first and second matrixes, maintaining the charge and discharge configurations for the first period of time; configuring the first and second matrixes and maintaining the charge and discharge configurations for the second period of time at a rate that exceeds 2 megahertz.

\* \* \* \* \*